(12) United States Patent
Wang et al.

(10) Patent No.: US 12,546,025 B2
(45) Date of Patent: Feb. 10, 2026

(54) NANOCARBON COATING SYSTEM AND COATING METHOD FOR STRAY AND REFLECTED LIGHT SUPPRESSION

(71) Applicant: Faraday Technology, Inc., Englewood, OH (US)

(72) Inventors: Dan Wang, Dublin, OH (US); Timothy David Hall, Englewood, OH (US); Maria E. Inman, Yellow Springs, OH (US); Rajeswaran Radhakrishnan, Beavercreek, OH (US); Earl Jennings Taylor, Troy, OH (US)

(73) Assignee: Faraday Technology, Inc., Englewood, OH (US)

( * ) Notice: Subject to any disclaimer, the term of this patent is extended or adjusted under 35 U.S.C. 154(b) by 668 days.

(21) Appl. No.: 17/953,885

(22) Filed: Sep. 27, 2022

(65) Prior Publication Data

US 2023/0121487 A1 Apr. 20, 2023

Related U.S. Application Data

(60) Provisional application No. 63/255,481, filed on Oct. 14, 2021.

(51) Int. Cl.
*C25D 13/22* (2006.01)
*B82Y 30/00* (2011.01)
*C25D 13/02* (2006.01)
*C25D 13/18* (2006.01)

(52) U.S. Cl.
CPC ............ *C25D 13/22* (2013.01); *C25D 13/02* (2013.01); *B82Y 30/00* (2013.01); *C25D 13/18* (2013.01)

(58) Field of Classification Search
CPC .......... C25D 9/04; C25D 13/02; C25D 13/22; C25D 13/18; C25D 13/12; B82Y 30/00
See application file for complete search history.

(56) References Cited

U.S. PATENT DOCUMENTS

| | | | |
|---|---|---|---|
| 6,080,504 A | 6/2000 | Taylor et al. |
| 6,203,684 B1 | 3/2001 | Taylor et al. |
| 6,210,555 B1 | 4/2001 | Taylor et al. |
| 6,303,014 B1 | 10/2001 | Taylor et al. |
| 6,309,528 B1 | 10/2001 | Taylor et al. |
| 6,319,384 B1 | 11/2001 | Taylor et al. |
| 6,524,461 B2 | 2/2003 | Taylor et al. |
| 6,551,484 B2 | 4/2003 | Hey et al. |
| 6,652,727 B2 | 11/2003 | Taylor et al. |
| 6,750,144 B2 | 6/2004 | Taylor |
| 6,827,833 B2 | 12/2004 | Taylor et al. |
| 6,863,793 B2 | 3/2005 | Taylor et al. |
| 6,878,259 B2 | 4/2005 | Taylor et al. |

(Continued)

OTHER PUBLICATIONS

"Effective Hybrid Graphene/Carbon Nanotubes Field Emitters by Electrophoretic Deposition" to Koh et al., J. Appl. Phys. 113, 174909 (2013).*

*Primary Examiner* — Bryan D. Ripa
(74) *Attorney, Agent, or Firm* — Iandiorio Teska & Coleman, LLP

(57) ABSTRACT

A method of coating a substrate, the method comprises adding a nanocarbon material to an electrophoretic solution in an electrophoretic deposition apparatus including the substrate and an electrode spaced from the substrate, and applying a current to the substrate and the electrode to deposit the nanocarbon material onto the substrate.

11 Claims, 20 Drawing Sheets

(NOT TO SCALE)

(56) References Cited

U.S. PATENT DOCUMENTS

| | | | |
|---|---|---|---|
| 8,603,315 B2 | 12/2013 | Taylor et al. | |
| 10,100,423 B2 | 10/2018 | Hall et al. | |
| 10,684,522 B2 | 6/2020 | Taylor et al. | |
| 2004/0055892 A1* | 3/2004 | Oh | C25D 15/00 205/109 |
| 2020/0399479 A1* | 12/2020 | Zawacky | C09D 7/61 |

* cited by examiner (NOT TO SCALE)

(NOT TO SCALE)

(NOT TO SCALE)

(NOT TO SCALE)

(NOT TO SCALE)

$\delta_H$ - HYDRODYNAMIC (NERNST) BOUNDARY LAYER.
$\delta_p$ - INNER PULSATING "ELECTRODYNAMIC" BOUNDARY LAYER.
$\delta_s$ - OUTER STATIONARY BOUNDARY LAYER.

NANOCARBON COATING SYSTEM AND COATING METHOD FOR STRAY AND REFLECTED LIGHT SUPPRESSION

RELATED APPLICATIONS

This application claims benefit of and priority to U.S. Provisional Application Ser. No. 63/255,481 filed Oct. 14, 2021, under 35 U.S.C. §§ 119, 120, 363, 365, and 3 7 C.F.R. § 1.55 and § 1.78, which is incorporated herein by this reference.

GOVERNMENT RIGHTS

This invention was made with U.S. Government support under Contract Nos. 80NSSC18P2062 and 80NSSC19C0177 awarded by the National Aeronautics and Space Administration (NASA). This invention was made with U.S. Government support under Contract No. HQ0147-19-C-7065 awarded by the Missile Defense Agency (MDA). The Government has certain rights in the subject invention.

FIELD OF THE INVENTION

This subject invention relates to a coating and a coating deposition method for application of nanocarbons to substrates with a variety of geometries as functional coatings for stray and reflected light suppression.

BACKGROUND OF THE INVENTION

Nanocarbons comprising carbon nanotubes (CNTs) and/or graphene have been gathering attention in both fundamental research and technological applications. The use of the term CNTs is understood to encompass single walled carbon nanotubes (SWCNTs), multiwalled carbon nanotubes (MWCNTs) or mixtures thereof. Due to their excellent physiochemical properties, CNTs and/or graphene have great potential in applications ranging from thermal interface materials, optical sensors, black body absorbers, biomedicine applications, charge dissipation, and functional coatings.

Low-reflectivity coatings have wide applications in the fields of aerospace, energy, military, defense, and daily life, such as baffles for minimizing stray light to improve the resolution of a space telescope and the sensitivity of exo-atmospheric optical sensors for missile defense and satellite-based surveillance systems, and solar absorbers for solar thermal power generation.

For practical use, nanocarbon coatings comprising CNTs and/or graphene need to be deposited on various substrates of varying geometries in a cost-effective manner in order to exploit low-reflectance properties. Conventional CNT and/or graphene coatings are applied or grown on a substrate using various approaches such as chemical vapor deposition (CVD), spin-casting, spraying and the like. However, CVD manufacturing approaches require that the substrates withstand high temperatures (usually several hundreds to one thousand degrees Celsius) and hydrocarbon environments which limits the scalability and practical application of CVD coating method. Mechanical force driven approaches, such as spin-casting and spraying, present challenges regarding coating uniformly particular on non-planar substrates, such as sharp or bent substrates, and unavoidably waste the coatings materials.

BRIEF SUMMARY OF THE INVENTION

A need exists for a nanocarbon coating comprising CNTs and/or graphene and mixtures thereof for low-reflective applications. Furthermore, a low-cost and scalable nanocarbon coating method for uniformly applying said nanocarbon coatings to planar and irregularly shaped surfaces is desired.

The instant disclosure relates to a nanocarbon coating and nanocarbon coating method for economical and a scalable nanocarbon coating method for application of said nanocarbon coatings to various substrates with various geometries for low-reflectance applications. The problem of forming uniform nanocarbon coatings on the substrates with a variety of geometries for low-reflectance applications is solved by the development of pulsed electrophoretic deposition technology followed by, in some instances, subjecting the nanocarbon coating to a plasma treatment to enhance the nanocarbon coating properties. An electrophoretic deposition (EPD) process, based on the use of pulsed electric fields, provides for controlled, reproducible, scalable, uniform deposition nanocarbon coatings comprising CNTs, graphene, and mixtures thereof. The subject nanocarbon coatings can enhance the low-reflectivity properties of planar and non-planar substrates.

In one preferred embodiment, the uniform nanocarbon coating comprising CNTs, graphene or combinations thereof with a polymeric binder is uniformly applied to a substrate (e.g., aluminum or beryllium) using pulsed electrophoretic deposition. In one preferred embodiment, the uniform nanocarbon coating comprising CNTs, graphene or combinations thereof without a polymeric binder is uniformly applied to a substrate using pulsed electrophoretic deposition followed by a plasma treatment enhancing the low-reflectivity performance.

In one preferred embodiment, the uniform nanocarbon coating comprising CNTs, graphene or combinations thereof is uniformly applied in layers to a substrate using pulsed electrophoretic deposition followed by plasma treatment in an iterative process exhibits durability to simulated space launch vehicle conditions.

In one preferred embodiment, the uniform nanocarbon coating comprising CNTs, graphene or combinations thereof is uniformly applied in layers to a substrate using pulsed electrophoretic deposition followed by plasma treatment in an iterative process exhibiting excellence resilience to at least 5000 ESH UV radiation.

Featured is a carbon nanotube (CNT) or CNT-graphene composite coating application approach with a small polymer binder concentration on a variety of geometries, including flat coupons, curved surfaces, sharp edges, and internal and external surfaces of complex geometries, as low-reflective coatings for stray and reflected light suppression. Also featured is a carbon nanotube (CNT) or CNT-graphene composite coating application approach with a small polymer binder concentration that has underwent a post plasma surface treatment to further improve the low-reflective properties of the coating for stray and reflected light suppression. The carbon nanotube (CNT) or CNT-graphene composite coating application approach with a small polymer binder concentration can be applied to various conductive substrates including: Al, Be, Au, W, ITO, steel, etc. The CNT or CNT-graphene composite coating application approach is applicable on a variety of geometries without polymer binder concentration, including flat coupons, curved surfaces, and sharp edges, and internal and external surfaces of complex geometries, as low-reflective coatings for stray and reflected light suppression while reducing low-reflective property loss due to atomic oxygen erosion. The carbon nanotube (CNT) coating maintains its low-reflective properties after exposure to 5000 equivalent sun hours of ultraviolet radiation. A multi-step application approach to apply carbon nanotube (CNT) or CNT-graphene composite coatings without the presence of a binder utilizes an iterative technique that includes electrophoretic deposition and plasma treatments to create low reflective coatings.

Featured is a method of coating a substrate, the method comprising adding a nanocarbon material to an electrophoretic solution in an electrophoretic deposition apparatus including the substrate and an electrode spaced from the substrate and applying a current to the substrate and the electrode to deposit the nanocarbon material onto the substrate.

In one example the substrate coated with nanocarbon material is subject to a plasma treatment. The nanocarbon material may include carbon nanotubes. The typical substrate is stainless steel, aluminum, titanium, tungsten, beryllium, indium-doped tin oxide glass or fluorine-doped tin oxide glass. The method may further include adding a binder to the electrophoretic solution. The method may further include adding graphene to the electrophoretic solution.

The substrate may be coated with alternating layers of graphene and carbon nanotubes via pulsed electrophoretic deposition. The one or more layers of graphene may also include carbon nanotubes; and/or one or more layers of carbon nanotubes may include graphene. The one or more alternating layers can be plasma treated. The one or more layers of graphene may include a binder; and/or the one or more layers of carbon nanotubes may include a binder.

Also featured is a system for coating a substrate. One preferred system includes a tank with the substrate therein and an electrode spaced from the substrate, an electrophoretic solution in the tank along with carbon nanotube particles and/or graphene particles and an optional binder, and a power supply connected to the substrate and electrode to deposit the nanotube particles and/or the graphene particles and, if present, the binder onto the substrate. One exemplary system further includes a plasma treatment subsystem including chamber for the substrate with a gas therein and an RF generator to create a plasma in the chamber.

Also featured is a method of coating a substrate, the method comprising: adding a nanocarbon material to an electrophoretic solution with no binder material added thereto in an electrophoretic deposition apparatus including the substrate and an electrode spaced from the substrate; applying a current to the substrate and the electrode to deposit the nanocarbon material onto the substrate; and subjecting the substrate coated with nanocarbon material to a plasma treatment.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
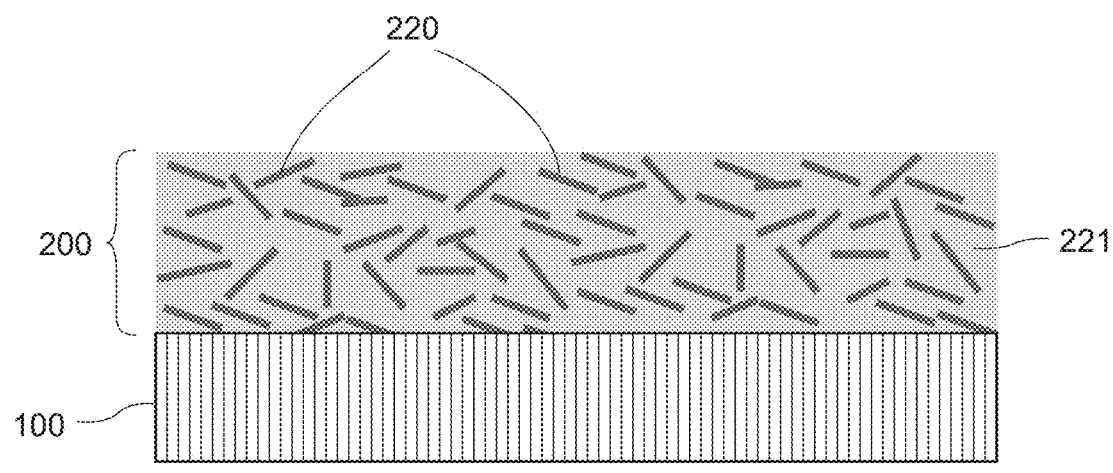
FIG. 1 illustrates an example of a nanocarbon coating system comprising carbon nanotubes (CNTs)

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Provided is a coating system and coating deposition method for application of nanocarbons to substrates with a variety of geometries as functional coatings for stray and reflected light suppression. The nanocarbon coating preferably comprises carbon nanotubes, (CNTs), graphene, or combinations thereof. Reference to carbon nanotubes (CNTs) is understood to be inclusive of single-wall carbon nanotubes (SWCNTs), multi-wall carbon nanotubes (MWCNTs) or mixtures thereof. In one preferred coating system, the nanocarbon carbon coating system is understood to be in the form of a single layer of CNTs or graphene, a mixture of CNTs and graphene or as one of more layers of graphene and CNTs. In some forms, the nanocarbon coating method includes a binder and or a plasma treatment. The nanocarbon carbon coating system is preferably applied to a substrate by an electrophoretic deposition process and preferably by a pulsed current electrophoretic deposition process.

FIG. 1 depicts a nanocarbon coating system 200 deposited on substrate 100. The substrate may be any suitable material used in spacecraft components, satellites, orbiting platforms, solar arrays and the like, such as stainless steel, aluminum 6061, titanium, tungsten, beryllium, indium-doped tin oxide (ITO) glass or fluorine-doped tin oxide (FTO) glass. The multifunctional coating system 200 comprises one or more layers of carbon nanotubes 220. The layer of carbon nanotubes 220 may or may not include a binder material 221, such as polyvinyl pyrrolidone (PVP).

Figure 2:
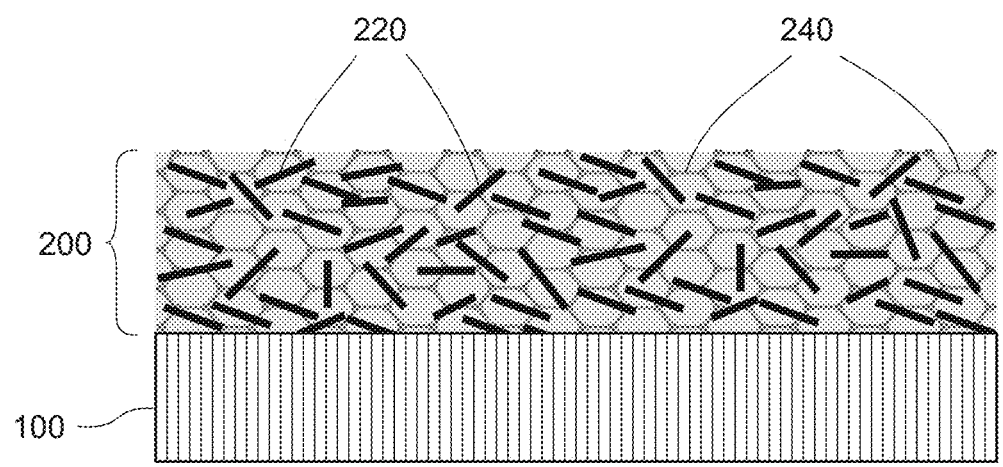
FIG. 2 illustrates an example of a nanocarbon coating system comprising a mixture of carbon nanotubes (CNTs) and graphene.

Nanocarbon coating system 200, FIG. 2 is deposited on substrate 100. The multifunctional coating system 200 comprises a layer consisting of carbon nanotubes 220 and nanocarbon graphene 240. The carbon nanotube 220 and graphene 240 layer may or may not include a binder material, such as polyvinyl pyrrolidone (PVP).

Figure 3:
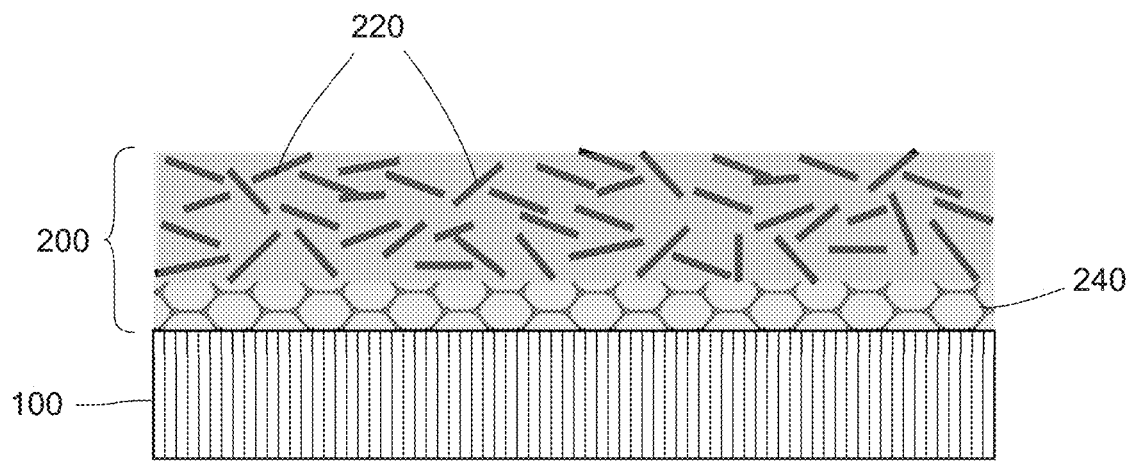
FIG. 3 illustrates an example of a nanocarbon coating system formed by sequentially depositing a layer of graphene on the substrate followed by a layer of carbon nanotubes (CNTs)

Nanocarbon coating system 200, FIG. 3 is deposited on substrate 100. By adjusting the coating deposition method as described herein, nanocarbon graphene 240 may be deposited first followed by deposition of carbon nanotubes 220 resulting in a layer of nanocarbon coating. The first deposited nanocarbon graphene 240 layer may or may not include a binder material, such as polyvinyl pyrrolidone (PVP). The subsequently deposited carbon nanotube 220 layer may or may not include a binder material such as polyvinyl pyrrolidone (PVP). Alternatively, although not illustrated in FIG. 3, one skilled in the art recognizes that the carbon nanotubes 220 may be deposited first followed by a deposition of nanocarbon graphene 240 resulting in a layer of nanocarbon coating. Additionally, multiple layers of carbon nanotubes 220 and nanocarbon graphene 240 may be deposited. The multiple layers of carbon nanotubes 220 and nanocarbon graphene may or may not include a binder such as polyvinyl pyrrolidone (PVP).

Figure 4:
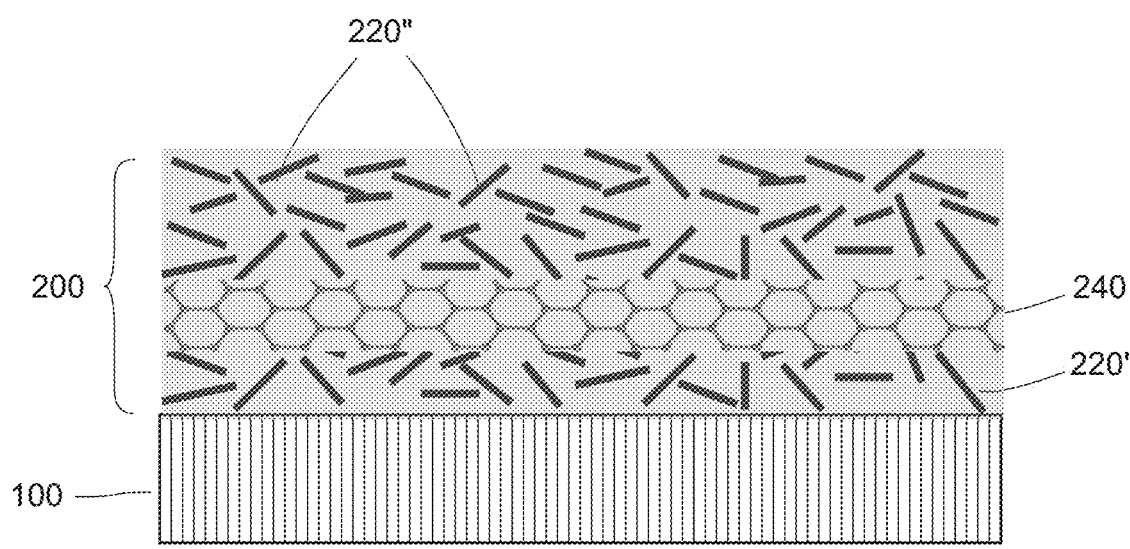
FIG. 4 illustrates an example of a nanocarbon coating system formed by sequentially depositing a first layer of carbon nanotubes (CNTs) on the substrate followed by a layer of graphene followed by a second layer of carbon nanotubes (CNTs)

Nanocarbon coating system 200, FIG. 4 is deposited on substrate 100. A first carbon nanotube 220' layer containing a binder such as polyvinyl pyrrolidone (PVP) is deposited (not shown); subsequently a nanocarbon graphene 240 layer not containing a binder is deposited; and subsequently a second carbon nanotube 220" layer not containing a binder is deposited.

Figure 5:
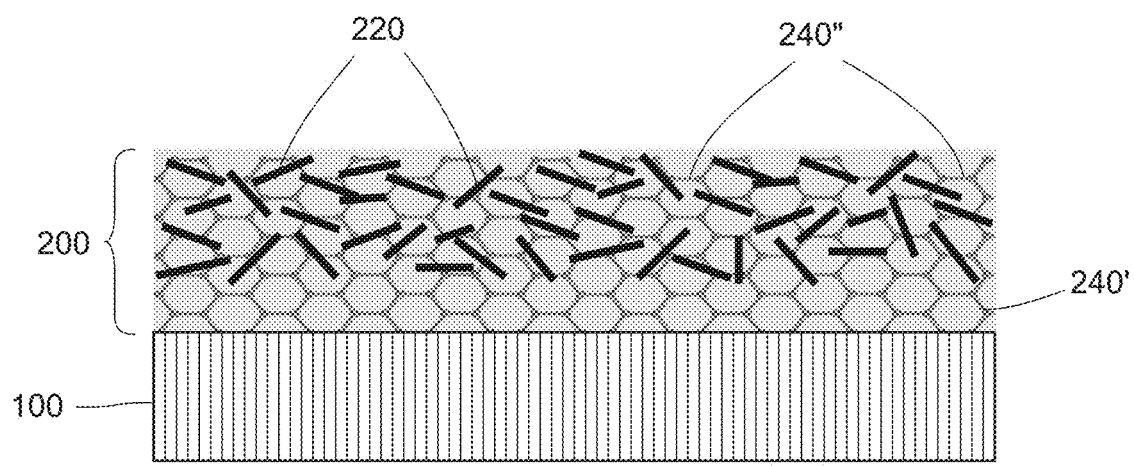
FIG. 5 illustrates an example of a nanocarbon coating system formed by sequentially depositing a layer of graphene on the substrate followed by a layer comprising a mixture of carbon nanotubes (CNTs) and graphene.

Nanocarbon coating system 200, FIG. 5 is deposited on substrate 100. By adjusting the coating deposition method as described herein, nanocarbon graphene 240 may be deposited first followed by a mixture of nanocarbons comprising carbon nanotubes 220 and graphene 240" resulting in a layer of nanocarbon coating. The nanocarbon graphene 240 layer may or may not include a binder such as polyvinyl pyrrolidone (PVP). The subsequently deposited mixture of nanocarbons comprising nanotubes 220 and nanocarbon graphene 240 may or may not include a binder such as polyvinyl pyrrolidone (PVP). Alternatively, although not shown in FIG. 5, one skilled in the art recognizes that the nanocarbon carbon nanotubes 220 may be deposited first followed by a mixture of nanocarbons comprising carbon nanotubes 220 and graphene 240" resulting in a layer of nanocarbon coating. The multiple layers of nanocarbon materials and mixtures of nanocarbon materials may or may not include a binder such as polyvinyl pyrrolidone (PVP).

Figure 6:
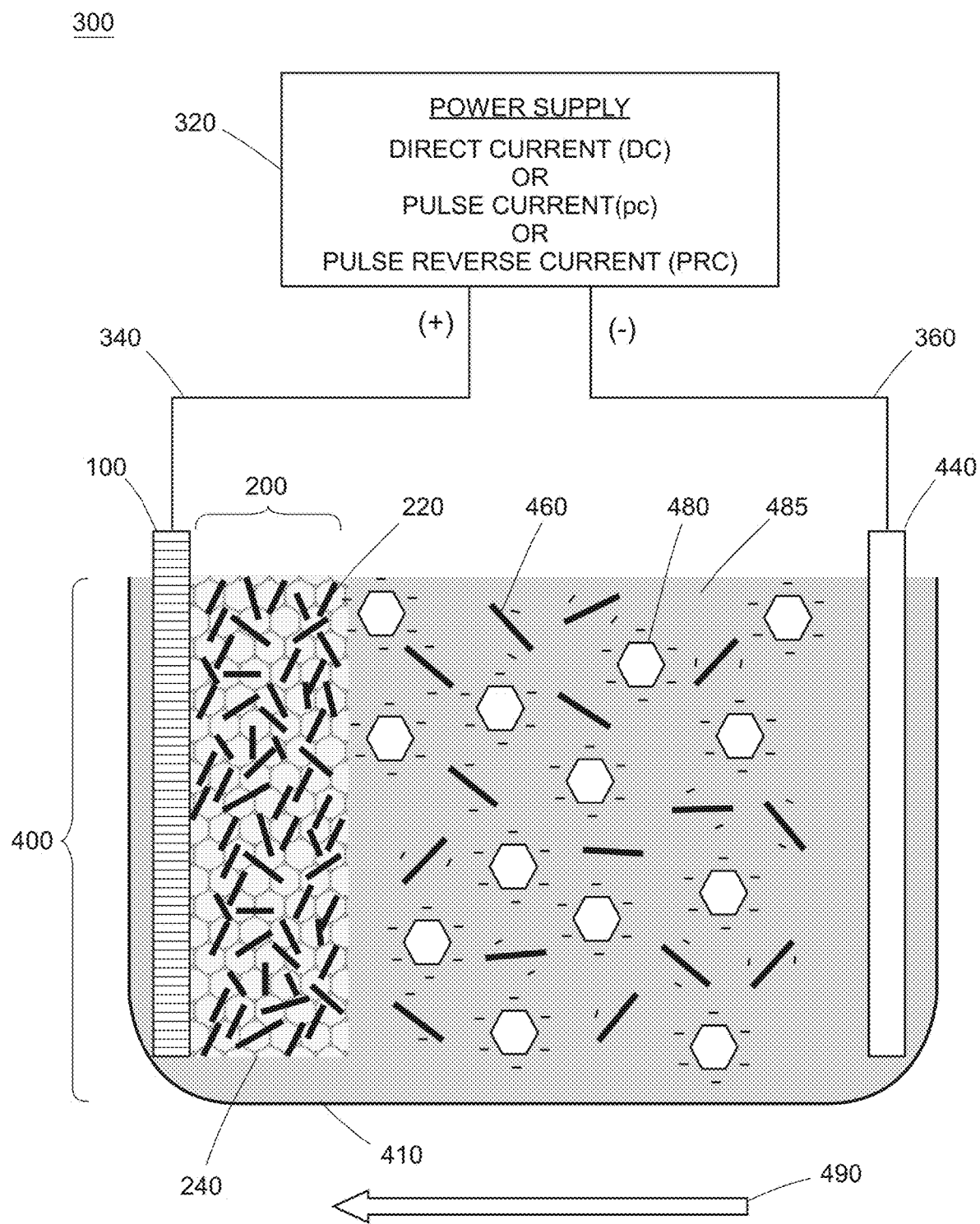
FIG. 6 illustrates an electrophoretic deposition process.

FIG. 6 is a schematic representation of an electrophoretic deposition apparatus 300. Included is a power supply 320 with an anode lead 340 and a cathode lead 360 capable of delivering a direct current (DC), pulse current (PC) or pulse reverse current (PRC) to an electrophoretic cell 400. The electrophoretic cell 400 includes a cell container 410 with an anode 100 (e.g., the substrate), a cathode 440, and an electrophoretic solution 485 with one or more suspended particles and an optional binder. The suspended carbon nanotube particles 460 and suspended graphene particles 480 develop a charge based on a number of factors such as material and solution 485 characteristics. FIG. 5 illustrates a negative charge on suspended carbon nanotube particles 460 and suspended graphene particles 480 however one skilled in the art recognizes that the charge could be positive depending on solution characteristics such as pH. Under the influence of the electric field resulting from power supply 320 negatively charged particles are driven by an electrophoretic force 490 to the positive anode 100 and electrophoretically deposited as a nanocarbon coating system 200 preferably comprising a mixture of carbon nanotubes 220 and graphene 240. Although FIG. 5 indicates that the coating is deposited on the anode 100, one skilled in the art recognizes that the coating could be deposited on the cathode 440. Furthermore, one skilled in the art recognizes that a layer of only graphene 240 is deposited if the solution 485 contains only suspended graphene particles 480. Alternatively, one skilled in the art recognizes that a layer of only carbon nanotubes 220 is deposited if the solution 485 contains only suspended carbon nanotube particles 460.

Electrolytic deposition or electrophoretic deposition may be practiced using direct current, pulse current or pulse reverse current. In direct current deposition processes, the current is applied to the electrolytic cell and generally held constant for a period of time, after which the deposit is formed on the electrode substrate. In pulse current/pulse reverse current electrolytic deposition, the current is interrupted and or reversed in predetermined ways. By properly selecting the pulse current/pulse reverse current waveform parameters, the deposit thickness, uniformity of deposition, localization of deposition, and properties are tuned for the specific application. Numerous embodiments of pulse current/pulse reverse current deposition are described by the common assignee of the instant invention in U.S. Pat. Nos. 6,080,504; 6,203,684; 6,210,555; 6,303,014; 6,309,528; 6,319,384; 6,524,461; 6,551,484; 6,652,727; 6,750,144; 6,827,833; 6,863,793; 6,878,259; 8,603,315; 10,100,423; 10,684,522; all incorporated herein by reference.

Figure 7:
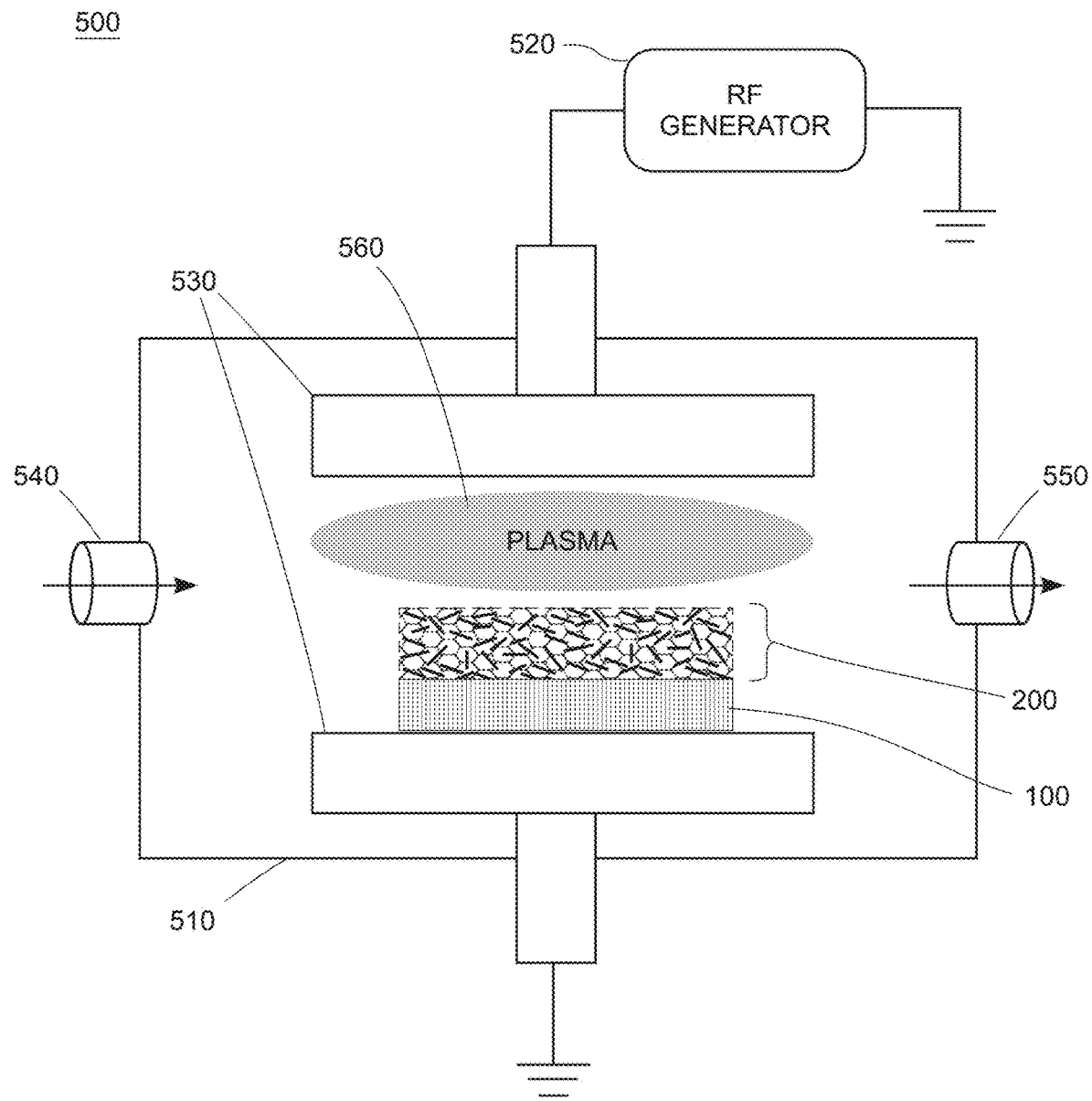
FIG. 7 illustrates a plasma treatment process.

FIG. 7 is a schematic representation of a plasma treatment apparatus 500. Included in the plasma treatment apparatus is a chamber 510, a radio frequency (RF) generator 520, electrodes 530, gas inlet 540, gas outlet 560. A substrate 100 with a nanocarbon coating system 200 is placed in the plasma treatment apparatus 500. The gas supplied to the plasma chamber 510 is an inert gas such as nitrogen, argon or mixtures thereof. On application of the appropriate processing conditions, a plasma 560 is generated to treat the nanocarbon coating system 200 to, for example, improve adhesion of coating to the substrate and/or improve the stability of coating to exposure of radiation in space environments, and/or to improve reflectance. In some examples, when a plasma treatment is used, no binder (or less binder) is required in the deposition process.

Figure 8:
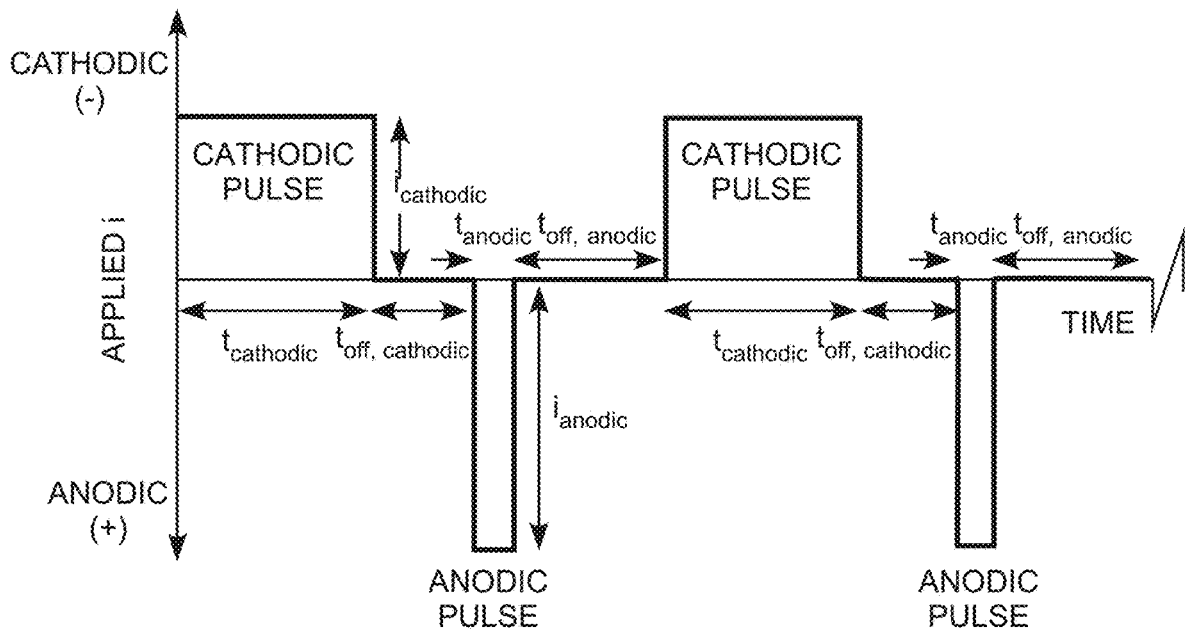
FIG. 8 illustrates a generalized pulse/pulse reverse waveform.

A generalized pulse current/pulse reverse current waveform is depicted in FIG. 8. The generalized waveform parameters are characterized by a cathodic pulse followed by an off-time and followed by an anodic pulse and followed by an off-time. One skilled in the art recognizes that one or both off-times may be eliminated and that the either the cathodic pulse or the anodic pulse may be eliminated. Furthermore, the waveform is generally net cathodic during electrolytic deposition. For electrophoretic deposition, the waveform is either net cathodic or net anodic to invoke the movement of positively charged or negatively charged particles towards the cathode or anode, respectively. The waveform parameters are: 1) anodic pulse current density, $i_{anodic}$, 2) anodic on-time, $t_{on,\ anodic}$, 3) cathodic pulse current density, $i_{cathodic}$, 4) cathodic on-time, $t_{on,\ cathodic}$, 5) cathodic off-time, $t_{off,\ cathodic}$ and 6) anodic off-time, $t_{off,\ anodic}$. The sum of the anodic and cathodic on-times and the off-time is the pulse period, T. The inverse of the pulse period is the frequency, f, of the pulse. The anodic, $\gamma_a$, and cathodic, $\gamma_c$, duty cycles are the ratios of the respective on-times to the pulse period. The average current density ($i_{aver}$) or net deposition rate is given by:

$$i_{aver}=i_c\gamma_c-i_a\gamma_a \qquad (1)$$

Just as there are infinite combinations of height, width, and length to obtain a given volume, in pulse processing there are unlimited combinations of peak voltages/current densities, duty cycles, and frequencies to obtain a given deposition rate in electrolytic and electrophoretic deposition processes. These parameters provide the potential for much greater process/product control compared to conventional DC deposition processes.

Mass transport in pulse current/pulse reverse current electrolytic and electrophoretic deposition processes is a combination of steady state and non-steady state diffusion processes. The mass transfer limited current density (ii) is related to the reactant concentration gradient ($C_b-C_s$) and to the diffusion layer thickness ($\delta$) by the following equation:

$$i_l=-nFD(\partial C/\partial x)_{x=0}=-nFD[(C_b-C_s)/\delta] \qquad (2)$$

where n, F, and D are the number of equivalents, Faraday's constant, and diffusivity of the reacting species, respectively. Much of the theory of mass transport with respect to pulse electrolysis is applicable to electrophoresis. In DC electrolysis, $\delta$ is a time-invariant quantity for a given electrode geometry and hydrodynamic condition. In pulse/pulse reverse electrolysis, however, $\delta$ varies from zero at the beginning of the pulse to its steady state value when the Nernst diffusion layer is fully established. The corresponding mass transport limiting current density would then be equal to an infinite value at t=0 and decreases to a steady state value of the DC limiting current density. The advantage of pulse/pulse reverse electrolysis is that the current can be interrupted before $\delta$ has a chance to reach steady state. This allows the reacting ions to diffuse back to the electrode surface and replenish the surface concentration to its original value before the next current interruption. Therefore, the concentration of reacting species in the vicinity of the electrode pulsates with the frequency of the modulation.

Figure 9:
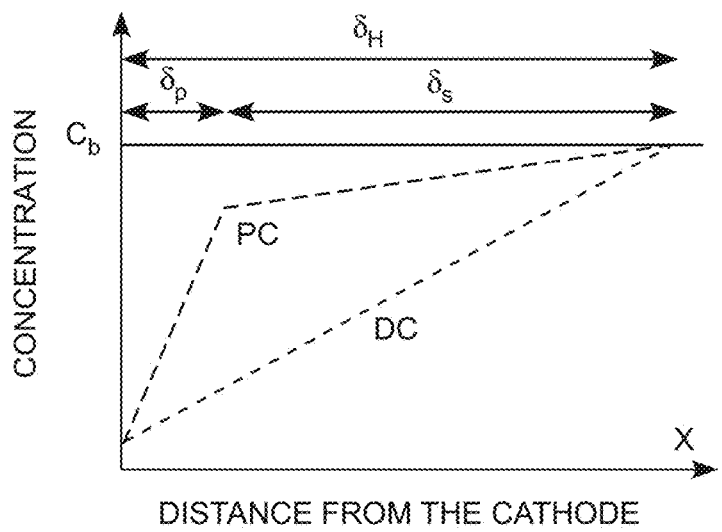
FIG. 9 illustrates a duplex pulsating boundary layer.

Under pulse electrolysis a "duplex diffusion layer" consisting of a pulsating layer, $\delta p$, and a stationary layer, $\delta s$. Modeling work has also suggested the existence of a pulsating diffusion layer. Since the thickness of the pulsating diffusion layer is determined by the waveform parameters, this layer may be thought of as an "electrodynamic diffusion layer" (See FIG. 9). By assuming a linear concentration gradient across the pulsating diffusion layer and conducting a mass balance, the pulsating diffusion layer thickness ($\delta p$) as:

$$\delta_p=(2Dt_{on})^{1/2} \qquad (3)$$

where $t_{on}$ is the pulse on time. When the pulse on time is equal to the transition time, the concentration of reacting species at the interface drops to zero at the end of the pulse. An expression for the transition time, $\tau$, is:

$$\tau=((nF)^2C_b^2D)/2i_c^2 \qquad (4)$$

More exact solutions are given by integrating Fick's diffusion equation:

$$\delta_p=2(Dt_{on}/\pi)^{1/2} \qquad (5)$$

$$\tau=\pi((nF)^2C_b^2D)/4i_c^2 \qquad (6)$$

The same equation for the pulsating diffusion layer is also relevant to pulse-reverse plating. The key points in the development of pulse current/pulse reverse current deposition processes are: (1) the electrodynamic diffusion layer thickness is proportional to the pulse on time and (2) transition time is inversely proportional to the current.

Figure 10:
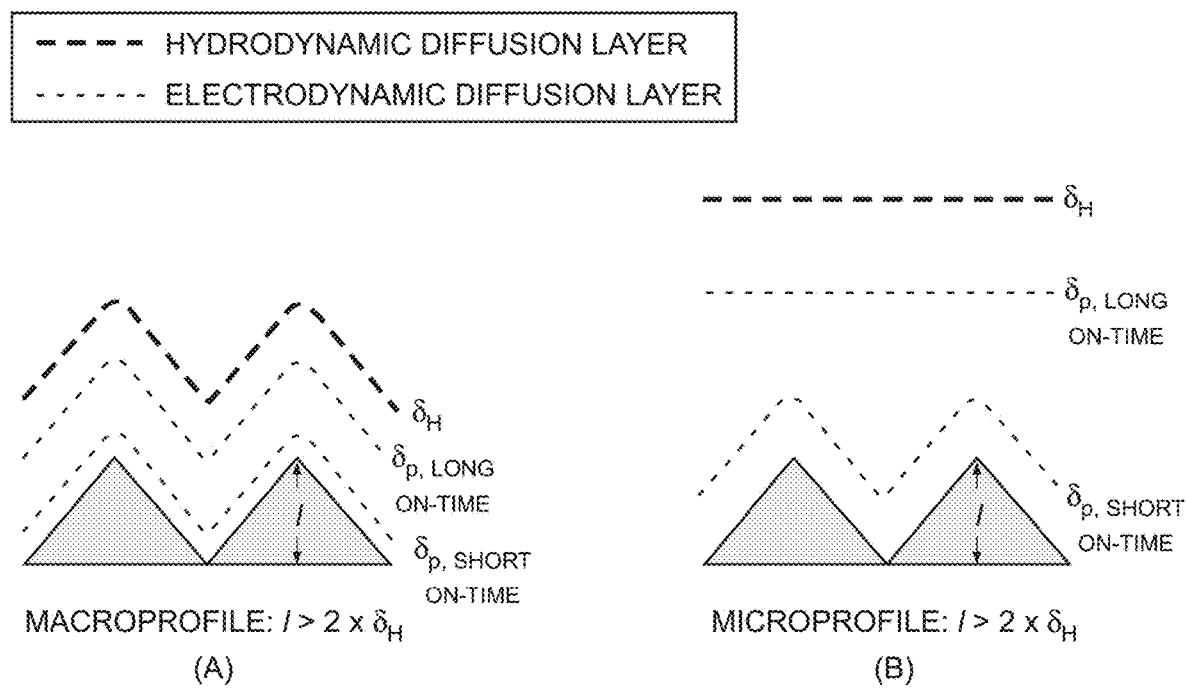
FIG. 10 illustrates a macroprofile and a microprofile boundary layer under direct current and pulse current conditions.

In electrolytic and electrophoretic deposition processes, deposit distribution is determined by the current distribution. The current distribution is controlled by primary (geometrical), secondary (kinetic) or tertiary (mass transport) effects. The addition of secondary or tertiary effects tends to make the current distribution more uniform, as compared to primary effects alone. If the applied waveform is designed such that the pulse on-time is much longer than the transition time, the tertiary current distribution will play an important role in the deposition. With the addition of tertiary control, the concept of macro- and micro-profiles influence the current distribution. In a macroprofile (FIG. 10A), the roughness of the surface is large compared with the thickness of the diffusion layer, and the diffusion layer tends to follow the surface contour. Under mass transport or diffusion control, a macroprofile results in a uniform current distribution or a conformal deposit during deposition. In a microprofile (FIG. 10B), the roughness of the surface is small compared with the thickness of the diffusion layer. Under mass transport control, a microprofile results in a non-uniform current distribution. By applying the appropriate waveform, one skilled in the art can effectively focus or defocus the current distribution to create non-uniform or uniform deposition respectively.

Figure 11:
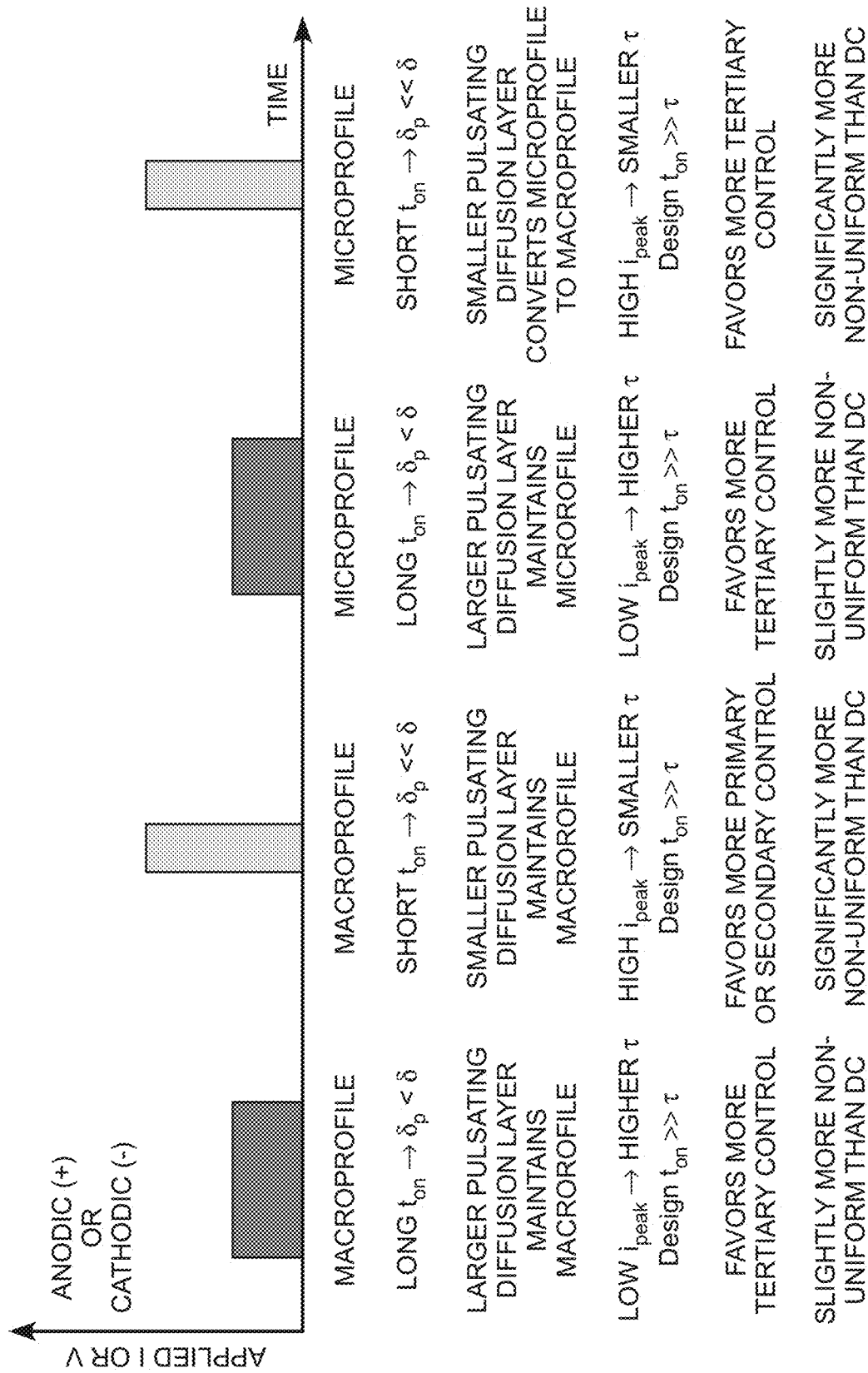
FIG. 11 is a summary of guiding principles for the impact of pulse parameters on deposit distribution.

FIG. 11 generally summarizes four pulse current waveform types, independent of cathodic pulse or anodic pulse, to influence the current distribution and hence the deposition distribution in either an electrolytic deposition process or an electrophoretic deposition process. In some embodiments of the instant invention, a direct current is employed to deposit a multifunctional coating system. In other cases, a pulse reverse current is employed to deposit a multifunctional coating system. In other cases, a pulse reverse current is employed to deposit a multifunctional coating system. In some embodiments, a multifunctional coating system is uniformly deposited across a surface. In other embodiments, a multifunctional coating system is locally deposited across a surface.

Figure 12:
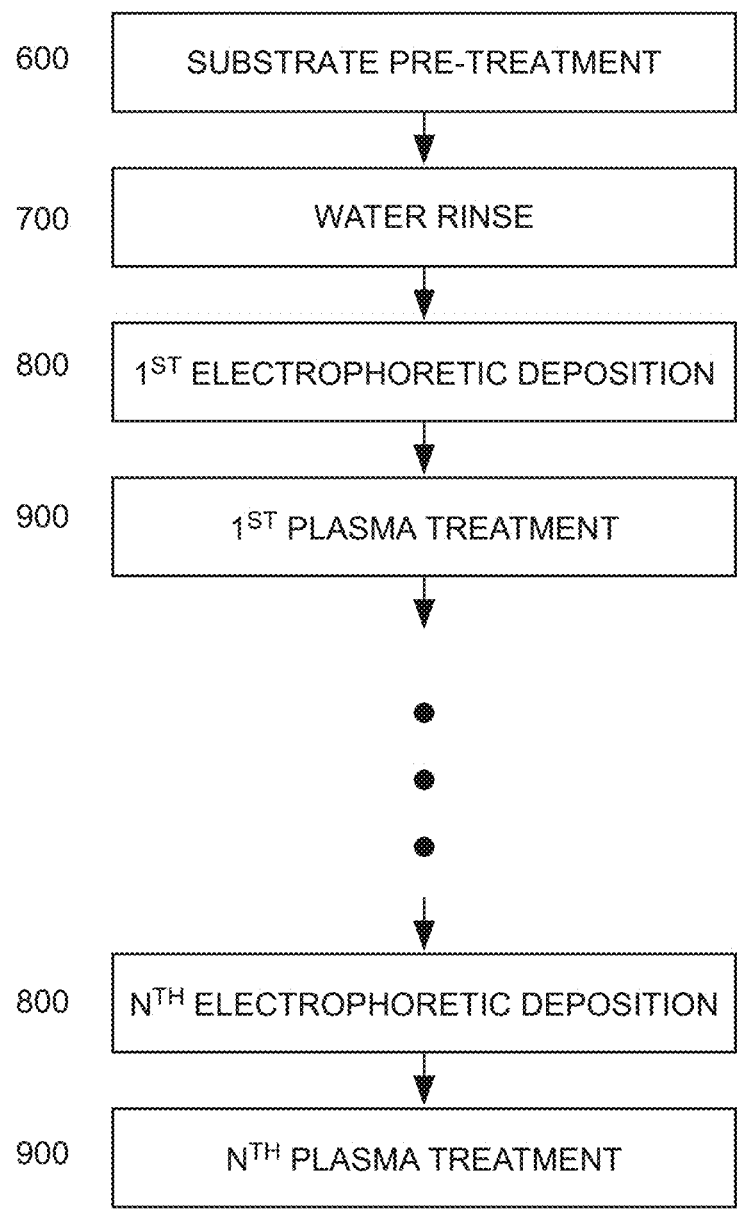
FIG. 12 is a flow diagram representation of a generalized multi-step electrophoretic deposition and plasma treatment process for a nanocarbon carbon coating system.

FIG. 12 presents an embodiment of the process steps in the coating deposition method of the instant invention. The process generally includes a substrate pre-treatment step 600 followed by a water rinse step 700. A substrate pre-treatment process for substrates that tend to form an oxide layer, such as aluminum 6061, a simple pre-treatment using simple pre-treatment solution is recently disclosed by the common assignee of the subject invention, U.S. patent application Ser. No. 16/869,014; the entire content is incorporated herein by reference. After the water rinse step 700, a first electrophoretic deposition step 800 is employed to deposit one or more of the components of the nanocarbon coating system. In a first plasma treatment step 900, the nanocarbon coating system is subjected to an RF generated plasma. Subsequent electrophoretic deposition steps 800 to deposit one or more components of the nanocarbon coating system followed by subsequent plasma treatment steps 900 are repeated to generate a layered coating system 200 subjected to plasma. While not bound by theory, the use of inert nitrogen gas during the plasma treatment step 900 may provide benefits to nitriding the nanocarbon layer comprising carbon nanotubes, graphene or mixtures thereof. Adding nitrogen molecules to the coating may improve adhesion and/or improves resistance to space environment exposure and/or, the plasma treatment may also roughen the coating surface resulting in a lower reflectance coating.

Figure 13:
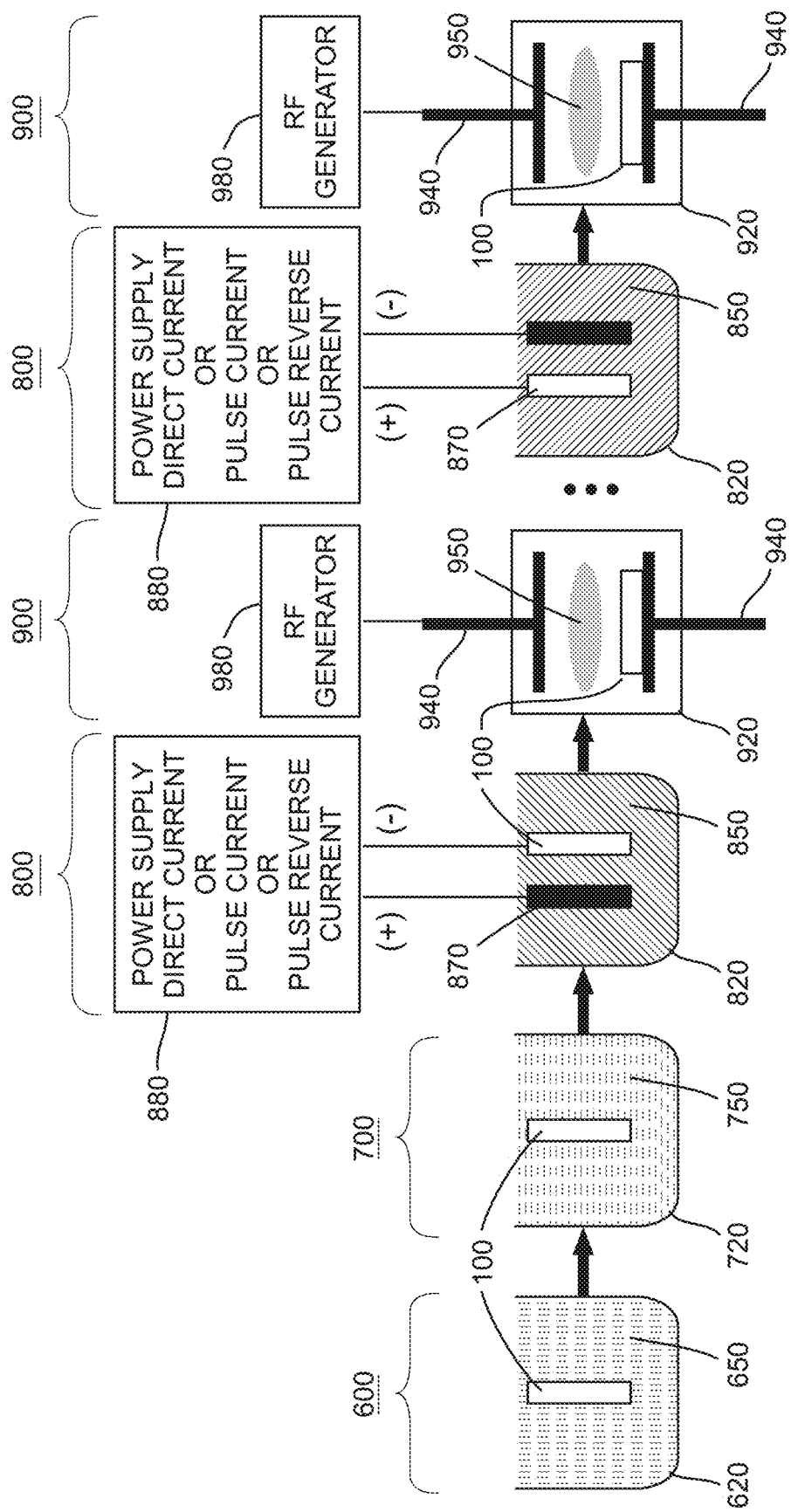
FIG. 13 generally depicts a process line for a multi-step electrophoretic deposition and plasma treatment process for a nanocarbon coating system.

FIG. 13 depicts a process line of an embodiment of the subject invention. The process line includes substrate pre-treatment step 600 with substrate 100 immersed in a pre-treatment solution 650 in cell 620. In water rinse step 700 substrate 100 is immersed in rinse water 750 in rinse cell 720. In electrophoretic deposition step 800 a power supply 880 is used to electrophoretically deposit one or more components of the nanocarbon coating system on substrate 100. The electrophoretic cell 820 contains a solution 850 with one or more suspended particles of the nanocarbon coating system and anode 870 and cathode 820. The electrophoretic deposition step is followed by a plasma treatment step 900 wherein RF generator supply 980 is used to treat the nanocarbon coating system on substrate 100. The plasma treatment apparatus 900 includes a chamber 920 with electrodes 940 generating plasma 950. The electrolytic deposition step 800 plasma treatment step 900 may be repeated to obtain the desired properties of the nanocarbon coating system.

The following examples illustrate various embodiments of the instant invention.

PRIOR ART EXAMPLE

Figure 14:
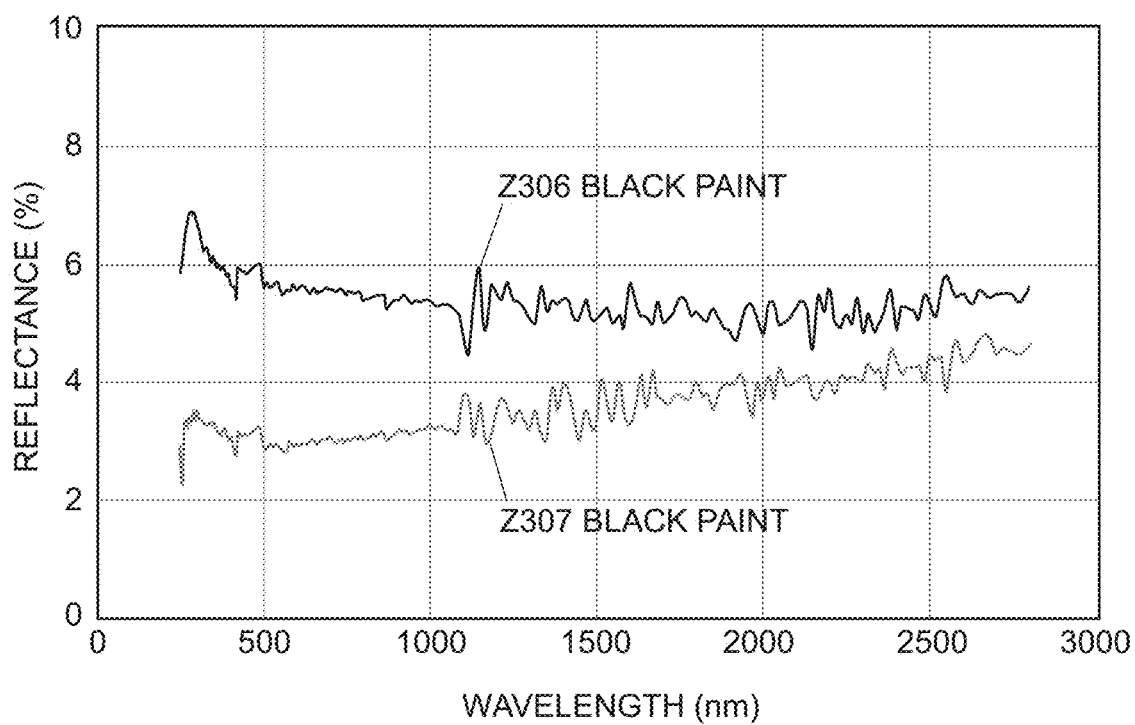
FIG. 14 shows the reflectance spectra of a paint coating according to the prior art.

Low reflectance coatings were prepared according to the prior art. The prior art coatings are black nonreflective paints Z306 and Z307 obtained from Coastline High Performance Coatings Ltd. The substrate was aluminum A96061. Prior to application of the low reflectance coating, the aluminum substrate was grit blasted with 80 grit alumina particles resulting in an increase in roughness from [0.4 μm Sa] prior to grit blasting to approximately 5.7 μm Sa after grit blasting. Sa is arithmetic mean height of the asperities and is a measure of surface roughness known to those of ordinary skill in the art. The nonreflective paints were applied to an aluminum A96061 substrate using standard procedures by Coastline High Performance Coatings Ltd. After application of the Z306 and Z307 low reflective prior art paint coatings, the samples were placed in a vacuum chamber at 125° C. for four days prior to reflectance measurements. The reflectance data for representative coatings prepared according to the prior art are presented in FIG. 14. The aluminum substrate coated with Z306 paint exhibited a reflectance of approximately 7 to 5% over an incident wavelength of approximately 250 to 2750 nm. The aluminum substrate coated with Z307 paint exhibited a reflectance of approximately 3 to 5% over an incident wavelength of approximately 250 to 2750 nm.

Figure 15:
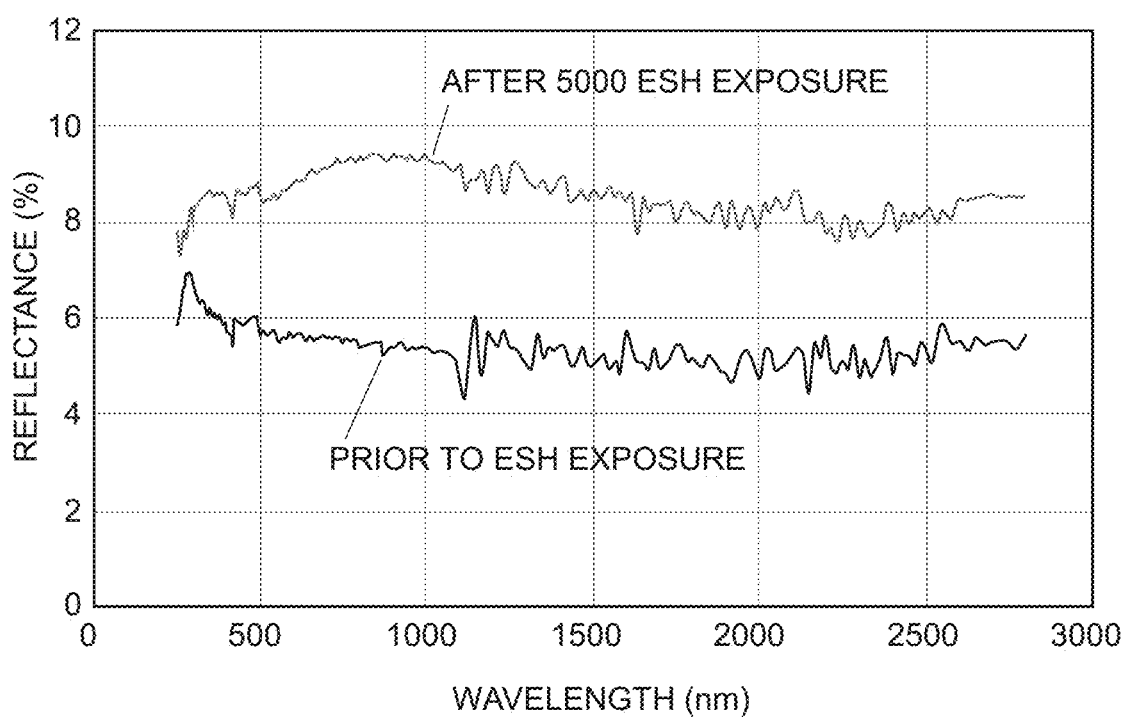
FIG. 15 shows the reflectance spectra of a paint coating according to the prior art before and after 5000 equivalent solar hours exposure.

The prior art coating with low reflective paint Z306 was exposed to 5000 equivalent solar hours (ESH) of ultraviolet (UV) radiation and vacuum ultraviolet (VUV) radiation. The Z306 paint coated sample was exposed to UV/VUV radiation. The UV radiation consisted of wavelength 200 to 400 delivered with a 2.5 kW xenon (Xe) horizontal short-arc lamp. The VUV radiation consisted of wavelength 115 to 180 nm delivered with 150 W deuterium arc lamp in a vacuum chamber. The prior art sample was exposed to 5000 ESH of UV/VUV radiation. The reflectance data for the prior art low reflective paint coating Z306 prior to and after 5000 ESH exposure are presented in FIG. 15. The absolute reflectance after 5000 ESH exposure over the wavelength range 250 to 2750 nm increased approximately 2.5 to 4%.

Working Example I

Figure 16:
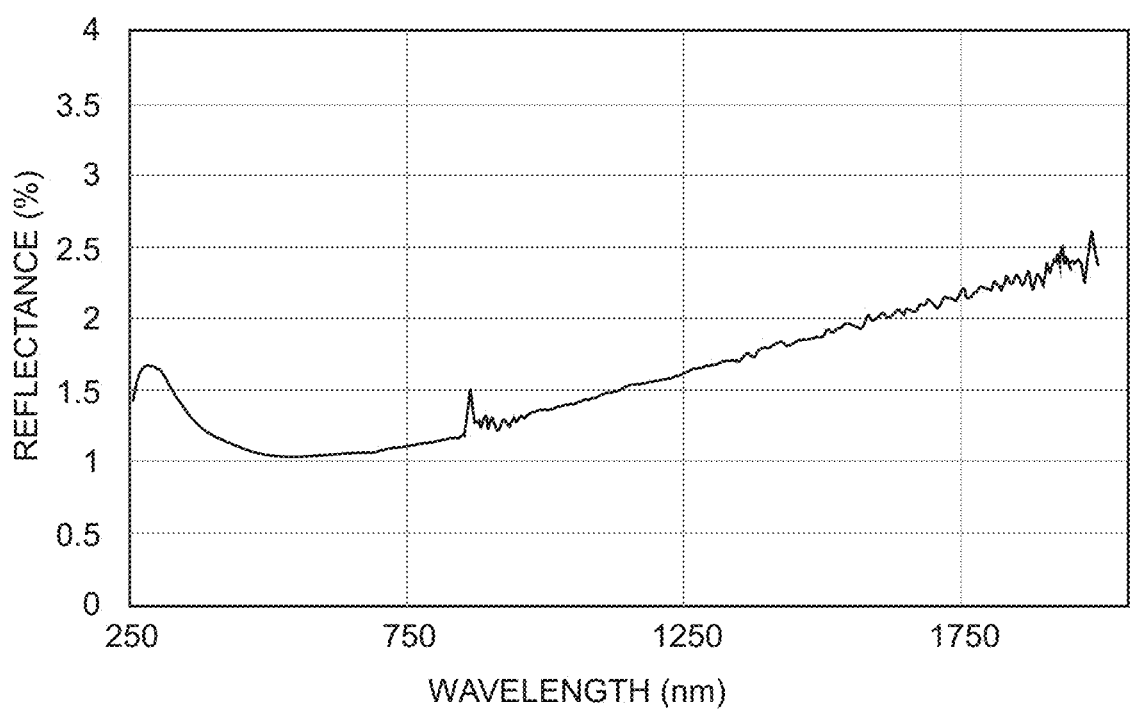
FIG. 16 shows the reflectance spectra of a CNT coating according to an embodiment of the invention.
Figure 17:
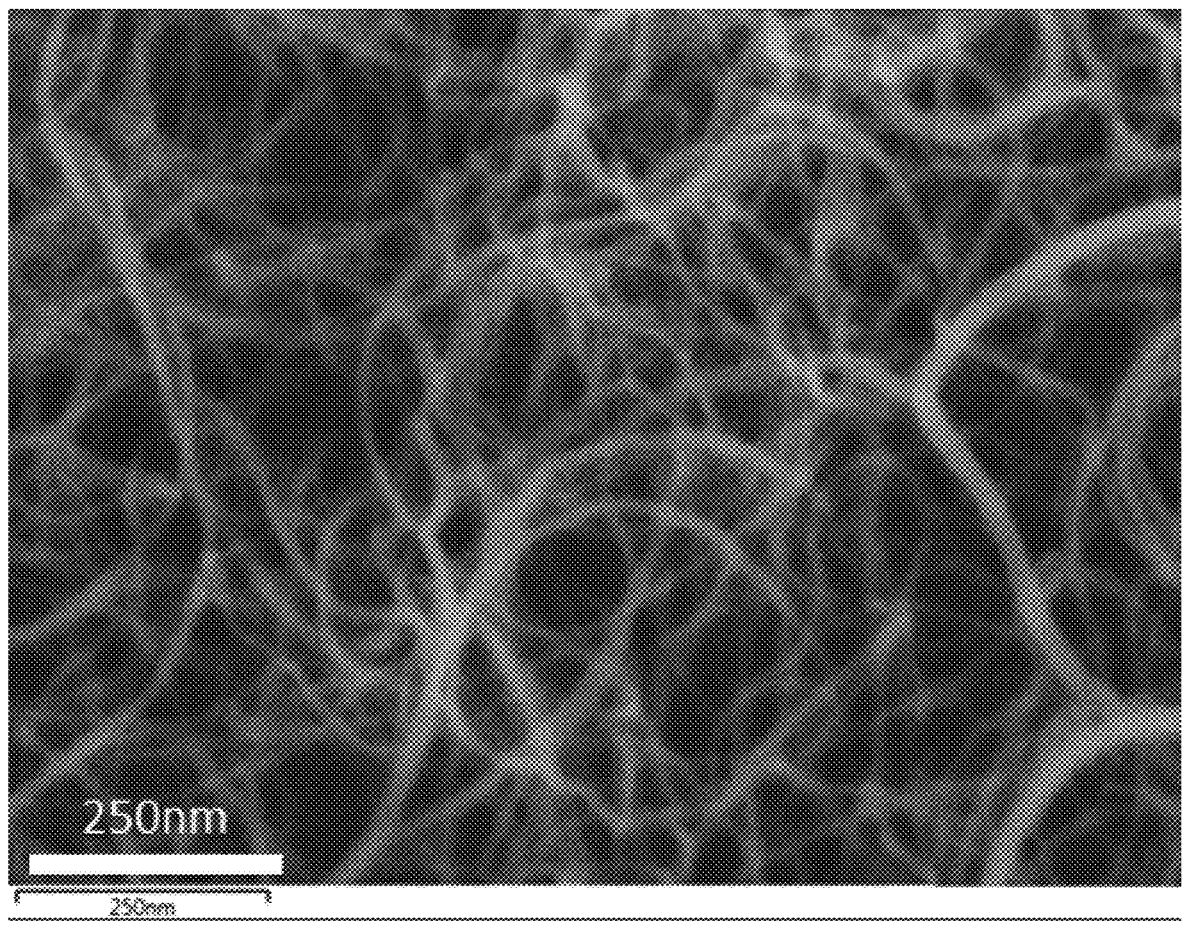
FIG. 17 shows the scanning electron micrograph image of a CNT coating according to an embodiment of the invention.

Low reflectance multiwalled carbon nanotube (MWCNT) ((carboxylic acid functionalized) obtained from Sigma-Aldrich, avg. diam. 9.5 nm, coatings were prepared according to an embodiment of the invention. The substrate was aluminum A96061. Prior to application of the low reflectance coating, the aluminum substrate was grit blasted with 80 grit alumina particles resulting in an increase in roughness from [0.4 μm Sa] prior to grit blasting to approximately 5.7 μm Sa after grit blasting. Sa is arithmetic mean height of the asperities and is a measure of surface roughness known to those of ordinary skill in the art. The low reflective MWCNT coating was electrophoretically deposited from an electrophoretic cell with the aluminum A96061 substrate separated from the cathode by approximately 2.5 cm. The electrophoretic solution includes 30 mg/L polyvinyl pyrrolidone (PVP, Molecular weight of 8,000) binder and 80 mg/L MWCNTs in ethanol. The MWCNTs were electrophoretically deposited using a pulse waveform with a peak voltage of 30 V, on-time of 0.8 msec, off-time of 0.2 msec for a duration of 60 min at room temperature of approximately 25° C. After application of the MWCNT low reflective coating, the samples were placed in a vacuum chamber at 125° C. for four days prior to reflectance measurements. The reflectance data for the MWCNT coating are presented in FIG. 16. The aluminum substrate coated with MWCNTs according to the example exhibited a reflectance of approximately 1 to 2.5% over an incident wavelength of approximately 250 to 2000 nm. The reflectance increased approximately linearly from approximately 1 to 2.5% over the wavelength range of 500 2000 nm. A scanning electron micrograph (SEM) of the surface of the MWCNT coating is presented in FIG. 17.

Working Example II

Figure 18:
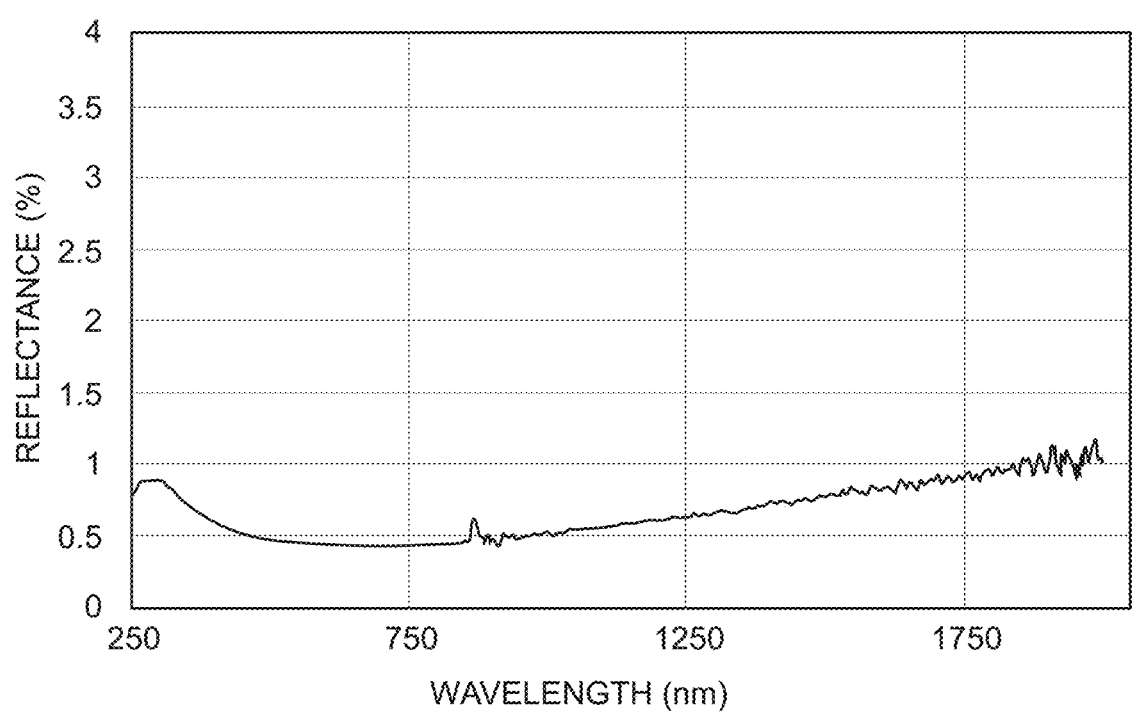
FIG. 18 shows the reflectance spectra of a CNT coating after a 30-minute plasma treatment according to an embodiment of the invention.
Figure 19:
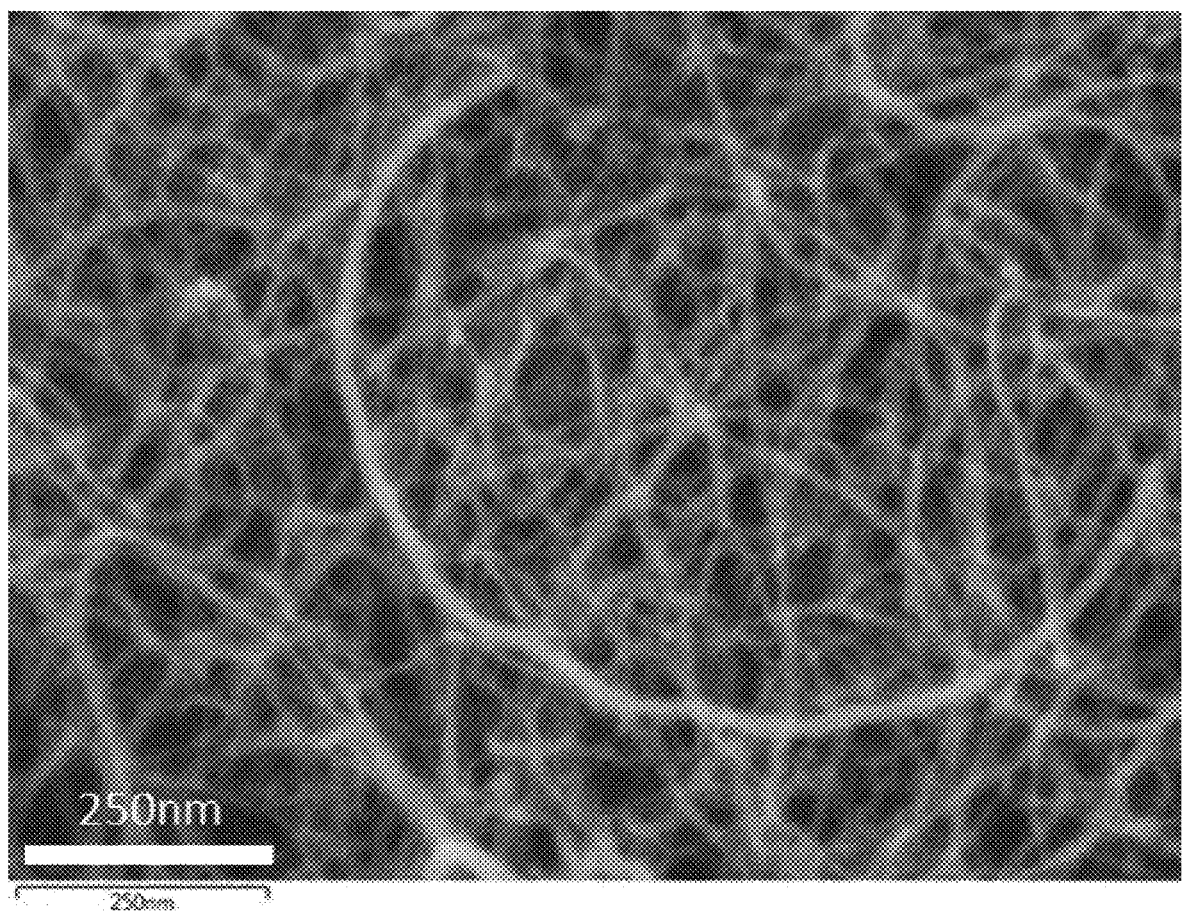
FIG. 19 shows the scanning electron micrograph image of a CNT coating after a 30-minute plasma treatment according to an embodiment of the invention.

Low reflectance multiwalled carbon nanotube (MWCNT) (carboxylic acid functionalized) obtained from Sigma-Aldrich, avg. diam. 9.5 nm) coatings were prepared according to an embodiment of the invention. The substrate was aluminum A96061. Prior to application of the low reflectance coating, the aluminum substrate was grit blasted with 80 grit alumina particles resulting in an increase in roughness from [0.4 μm Sa] prior to grit blasting to approximately 5.7 μm Sa after grit blasting. Sa is arithmetic mean height of the asperities and is a measure of surface roughness known to those of ordinary skill in the art. The low reflective MWCNT coating was electrophoretically deposited from an electrophoretic cell with the aluminum A96061 substrate separated from the cathode by approximately 2.5 cm. The electrophoretic solution consisted of 30 mg/L polyvinyl pyrrolidone (PVP, Molecular weight of 8,000) binder and 80 mg/L MWCNTs in ethanol. The MWCNTs were electrophoretically deposited using a pulse waveform with a peak voltage of 40 V, on-time of 0.4 msec, off-time of 0.6 msec for a duration of 60 min at room temperature of approximately 25° C. Subsequent to the electrophoretic deposition of MWCNT coating the MWCNT coating was subjected to a plasma treatment for 30 min. The plasma gas was nitrogen and the applied power was 30 W. After application of the MWCNT low reflective coating, the samples were placed in a vacuum chamber at 125° C. for four days prior to reflectance measurements. The reflectance data for the MWCNT coating are presented in FIG. 18. The aluminum substrate coated with MWCNTs according to the example exhibited a reflectance of approximately 0.5 to 1% over an incident wavelength of approximately 250 to 2000 nm. The reflectance increased approximately linearly from approximately 0.5 to 1% over the wavelength range of 500 2000 nm. A scanning electron micrograph (SEM) of the surface of the MWCNT coating is presented in FIG. 19. The plasma treatment appears to roughen the MWCNT coating compared to WORKING EXAMPLE I without plasma treatment.

Working Example III

Figure 20:
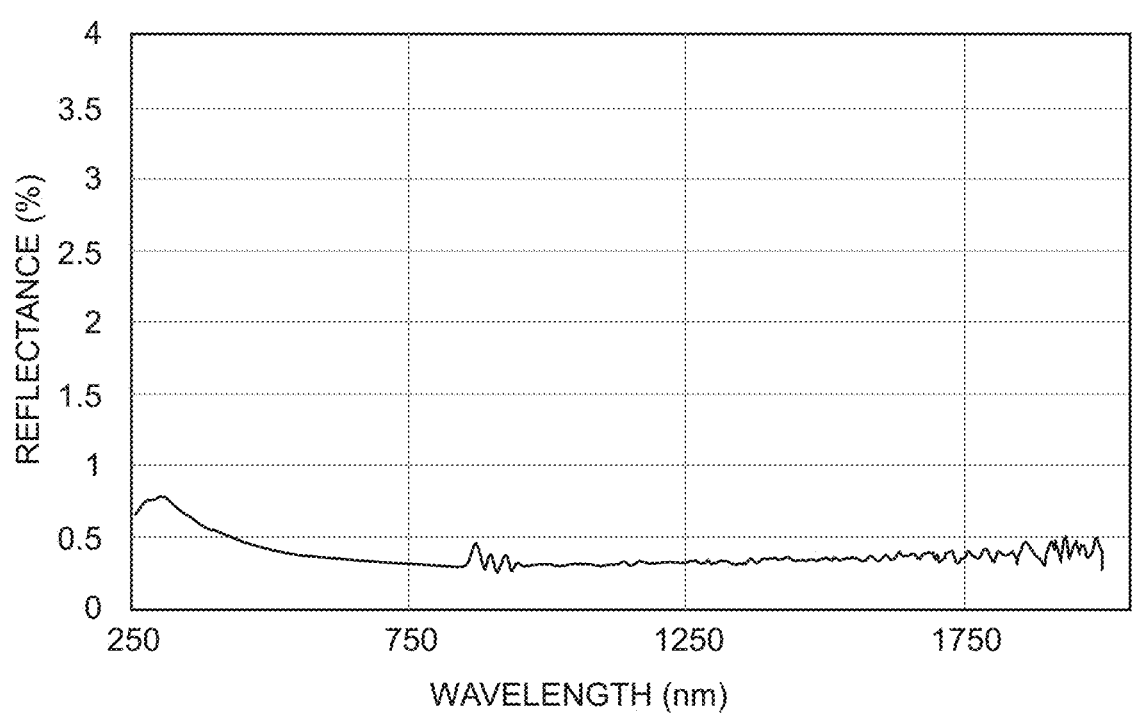
FIG. 20 shows the reflectance spectra of a CNT coating after a 90-minute plasma treatment according to an embodiment of the invention.
Figure 21:
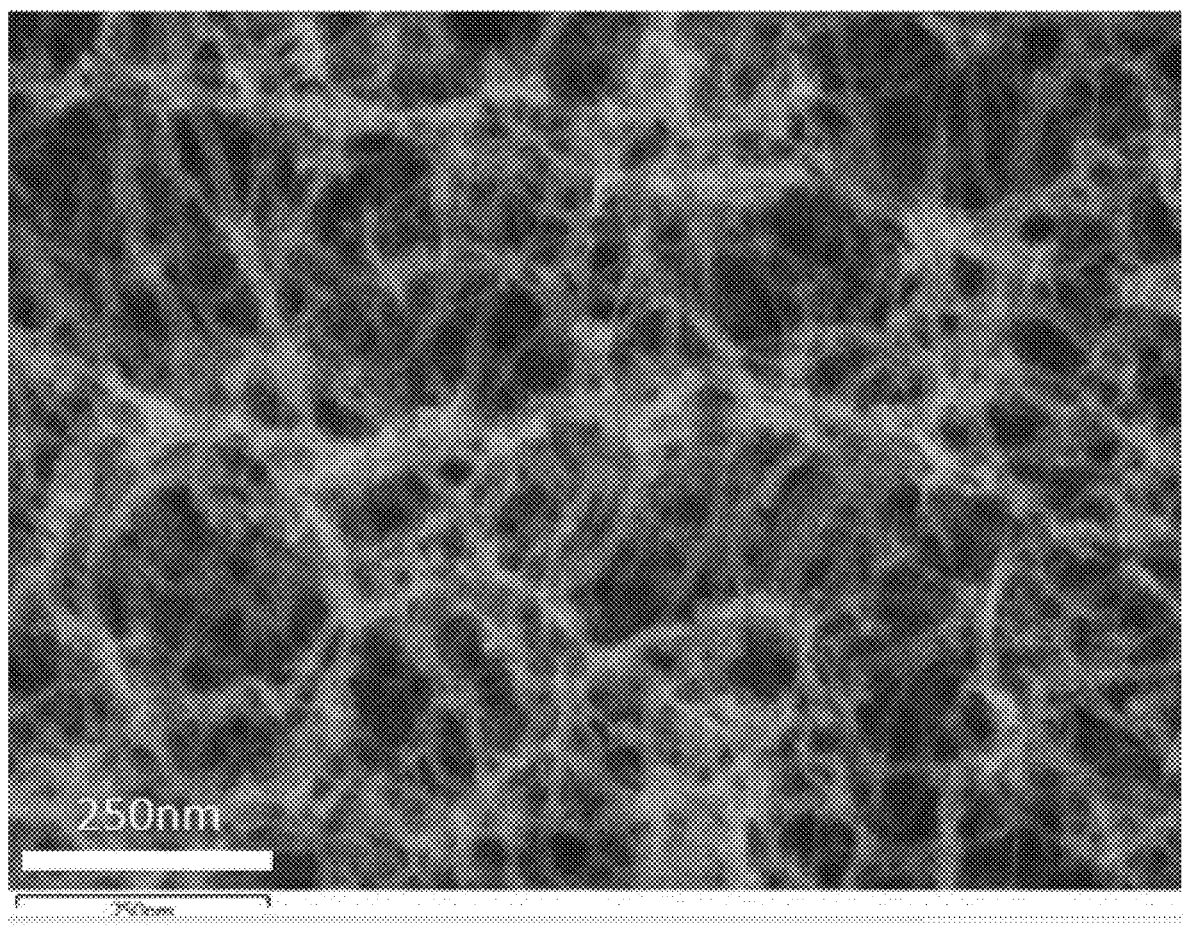
FIG. 21 shows the scanning electron micrograph image of a CNT coating after a 90-minute plasma treatment according to an embodiment of the invention.

Low reflectance multiwalled carbon nanotube (MWCNT) (carboxylic acid functionalized) obtained from Sigma-Aldrich, avg. diam. 9.5 nm) coatings were prepared according to an embodiment of the invention. The substrate was aluminum A96061. Prior to application of the low reflectance coating, the aluminum substrate was grit blasted with 80 grit alumina particles resulting in an increase in roughness from [0.4 μm Sa] prior to grit blasting to approximately 5.7 μm Sa after grit blasting. Sa is arithmetic mean height of the asperities and is a measure of surface roughness known to those of ordinary skill in the art. The low reflective MWCNT coating was electrophoretically deposited from an electrophoretic cell with the aluminum A96061 substrate separated from the cathode by approximately 2.5 cm. The electrophoretic solution consisted of 30 mg/L polyvinyl pyrrolidone (PVP, Molecular weight of 2,500) binder and 80 mg/L MWCNTs in ethanol. The MWCNTs were electrophoretically deposited using a pulse waveform with a peak voltage of 30 V, on-time of 0.8 msec, off-time of 0.2 msec for a duration of 60 min at room temperature of approximately 25° C. Subsequent to the electrophoretic deposition of MWCNT coating the MWCNT coating was subjected to a plasma treatment for 90 min. The plasma gas was nitrogen and the applied power was 30 W. After application of the MWCNT low reflective coating, the samples were placed in a vacuum chamber at 125° C. for four days prior to reflectance measurements. The reflectance data for the MWCNT coating are presented in FIG. 20. The aluminum substrate coated with MWCNTs according to the example exhibited a reflectance of approximately 0.4 to 0.5% over an incident wavelength of approximately 250 to 2000 nm. The reflectance increased approximately linearly from approximately 0.4 to 0.5% over the wavelength range of 500 2000 nm. A scanning electron micrograph (SEM) of the surface of the MWCNT coating is presented in FIG. 21. The plasma treatment appears to roughen the MWCNT coating compared to WORKING EXAMPLE I without plasma treatment.

Working Example IV

Figure 22:
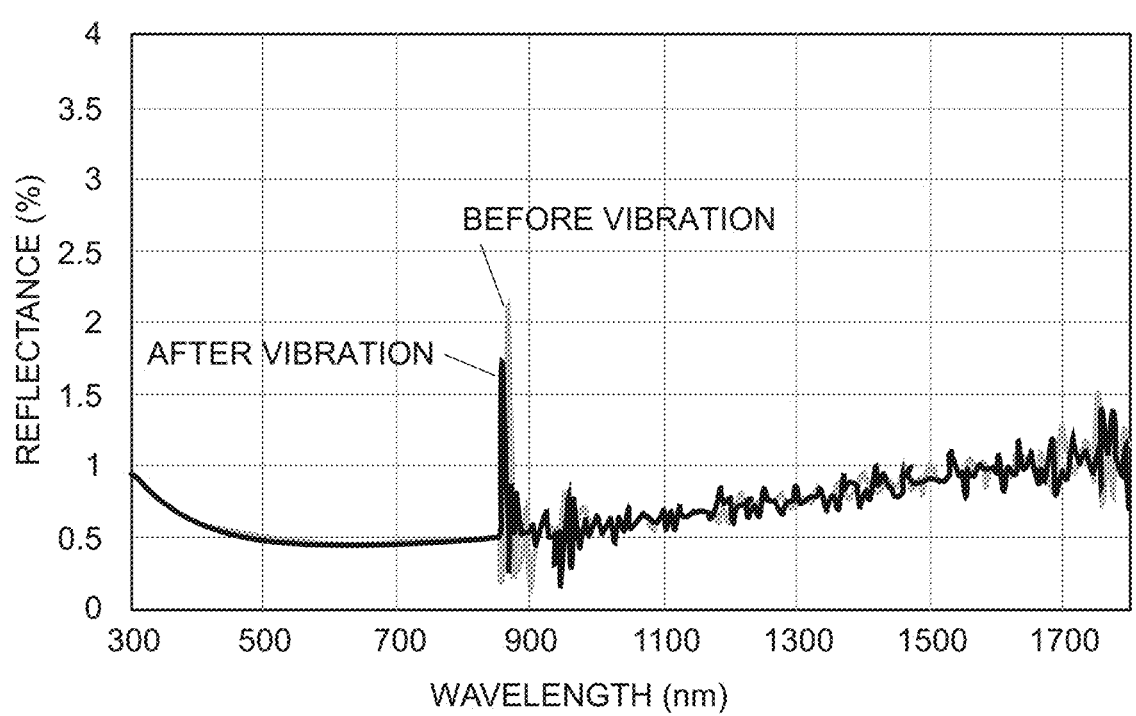
FIG. 22 shows the reflectance spectra of a CNT coating before and after a simulated space vehicle launch test according to an embodiment of the invention.

Low reflectance multiwalled carbon nanotube (MWCNT) (carboxylic acid functionalized) from Sigma-Aldrich, avg. diam. 9.5 nm) coatings were prepared according to an embodiment of the invention. The substrate was aluminum A96061. Prior to application of the low reflectance coating, the aluminum substrate was grit blasted with 80 grit alumina particles resulting in an increase in roughness from [0.4 μm Sa] prior to grit blasting to approximately 5.7 μm Sa after grit blasting. Sa is arithmetic mean height of the asperities and is a measure of surface roughness known to those of ordinary skill in the art. The low reflective MWCNT coating was electrophoretically deposited from an electrophoretic cell with the aluminum A96061 substrate separated from the cathode by approximately 2.5 cm. The electrophoretic solution was devoid of binder and only included 80 mg/L MWCNTs in ethanol. The MWCNTs were electrophoretically deposited using a pulse waveform with a peak voltage of 30 V, on-time of 0.8 msec, off-time of 0.2 msec for a duration of 15 min at room temperature of approximately 25° C. Subsequent to the electrophoretic deposition of MWCNT coating the MWCNT coating was subjected to a plasma treatment for 5 min. The plasma gas was nitrogen and the applied power was 30 W. The electrophoretic deposition followed by plasma treatment was repeated three more times under the same conditions with the exception that the final plasma treatment was conducted for 90 minutes. Consequently, the total electrophoretic deposition time was 60 minutes and the total plasma treatment time was 105 minutes. After application of the MWCNT low reflective coating, the samples were placed in a vacuum chamber at 125° C. for four days prior to reflectance measurements. After electrophoretic deposition and plasma treatment of the MWCNT coating, the sample was subjected to a vibration test simulating satellite launch conditions. Specifically, the sample was placed in a 2000 ft-lb shaker and vibrated at an applied frequency of 20 Hz to 2000 Hz for two minutes and 14 G force (NASA simulated launch conditions). The MWCNT coating survived vibration test and did not debond from the aluminum substrate. The reflectance data for the MWCNT coating before and after the vibration test are presented in FIG. 22. The sample prior to the vibration test and the sample after the vibration exhibit substantially the same reflectance over the wavelength range of 300 to 1750 nm.

Figure 23:
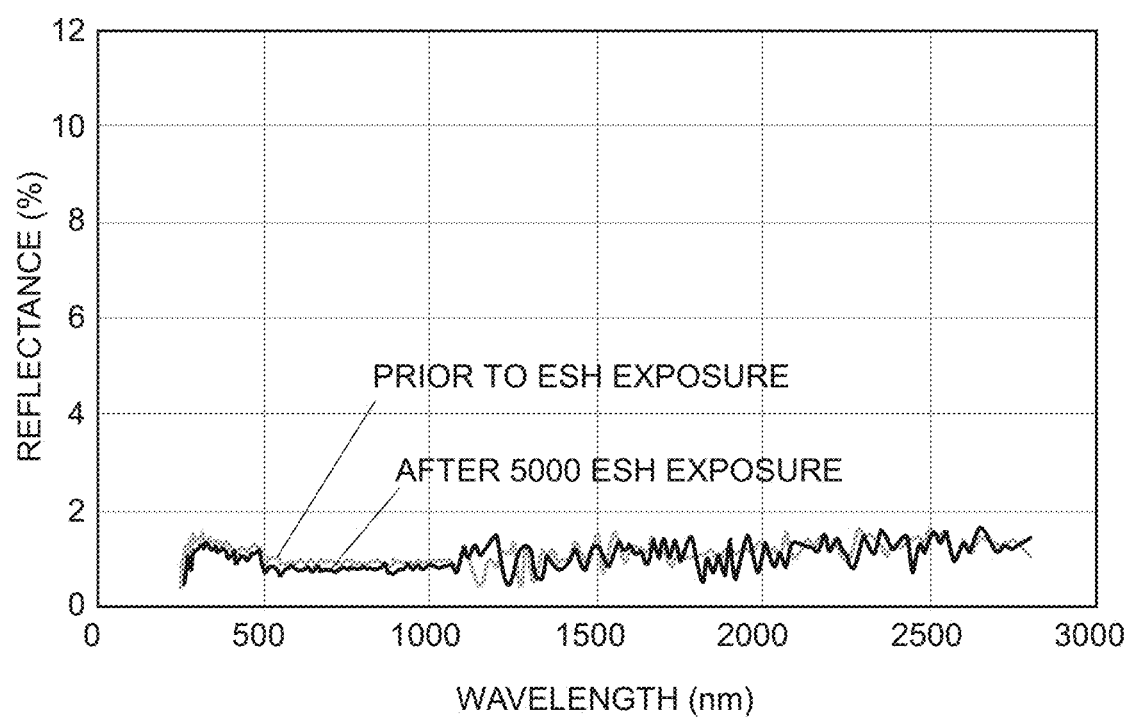
FIG. 23 shows the reflectance spectra of a CNT coating according to an embodiment of the invention before and after 5000 equivalent solar hours exposure.

The low reflectance MWCNT coating was exposed to 5000 equivalent solar hours (ESH) of ultraviolet (UV) radiation and vacuum ultraviolet (VUV) radiation. The prior art sample was exposed to UV/VUV radiation. The UV radiation consisted of wavelength 200 to 400 delivered with a 2.5 kW xenon (Xe) horizontal short-arc lamp. The VUV radiation consisted of wavelength 115 to 180 nm delivered with 150 W deuterium arc lamp in a vacuum chamber. The sample was exposed to 5000 ESH of UV/VUV radiation. The reflectance data for the prior art low reflective paint coating Z306 prior to and after 5000 ESH exposure are presented in FIG. 23. The absolute reflectance after 5000 ESH exposure over the wavelength range 250 to 2750 nm increased approximately 0.14 to 0.32%.

Working Example V

Double layered low reflectance multiwalled carbon nanotube (MWCNT) (carboxylic acid functionalized) from Sigma-Aldrich, avg. diam. 9.5 nm) coatings were prepared according to an embodiment of the invention. The substrate was aluminum A96061. Prior to application of the low reflectance coating, the aluminum substrate was grit blasted with 80 grit alumina particles resulting in an increase in roughness from [0.4 μm Sa] prior to grit blasting to approximately 5.7 μm Sa after grit blasting. Sa is arithmetic mean height of the asperities and is a measure of surface roughness known to those of ordinary skill in the art. The low reflective MWCNT coating was electrophoretically deposited from an electrophoretic cell with the aluminum A96061 substrate separated from the cathode by approximately 2.5 cm.

The electrophoretic solution for the first layer CNT coating consisted of 30 mg/L polyvinyl pyrrolidone (PVP, Molecular weight of 58,000) binder and 80 mg/L MWCNTs in ethanol. The MWCNTs were electrophoretically deposited using a pulse waveform with a peak voltage of 30 V, on-time of 0.8 msec, off-time of 0.2 msec for a duration of 15 min at room temperature of approximately 25° C. Subsequent to the electrophoretic deposition of MWCNT coating the MWCNT coating was subjected to a plasma treatment for 5 min. The plasma gas was nitrogen and the applied power was 30 W.

The electrophoretic solution for the second layer CNT coating was devoid of binder and only included 80 mg/L MWCNTs in ethanol. The MWCNTs were electrophoretically deposited using a pulse waveform with a peak voltage of 30 V, on-time of 0.8 msec, off-time of 0.2 msec for a duration of 15 min at room temperature of approximately 25 C. Subsequent to the electrophoretic deposition of MWCNT coating the MWCNT coating was subjected to a plasma treatment for 5 min. The plasma gas was nitrogen and the applied power was 30 W. The electrophoretic deposition followed by plasma treatment for the second layer CNT coating was repeated two more times under the same conditions with the exception that the final plasma treatment was conducted for 90 minutes.

The total electrophoretic deposition time was 60 minutes and the total plasma treatment time was 105 minutes for the double layered low reflectance CNT coatings.

Working Example VI

Three layered low reflectance multiwalled carbon nanotube (MWCNT) (carboxylic acid functionalized) from Sigma-Aldrich, avg. diam. 9.5 nm) based coatings were prepared according to an embodiment of the invention. The substrate was aluminum A96061. Prior to application of the low reflectance coating, the aluminum substrate was grit blasted with 80 grit alumina particles resulting in an increase in roughness from [0.4 μm Sa] prior to grit blasting to approximately 5.7 μm Sa after grit blasting. Sa is arithmetic mean height of the asperities and is a measure of surface roughness known to those of ordinary skill in the art. The low reflective MWCNT coating was electrophoretically deposited from an electrophoretic cell with the aluminum A96061 substrate separated from the cathode by approximately 2.5 cm.

The electrophoretic solution for the first layer CNT coating consisted of 30 mg/L polyvinyl pyrrolidone (PVP, Molecular weight of 58,000) binder and 80 mg/L MWCNTs in ethanol. The MWCNTs were electrophoretically deposited using a pulse waveform with a peak voltage of 30 V, on-time of 0.8 msec, off-time of 0.2 msec for a duration of 15 min at room temperature of approximately 25° C. Subsequent to the electrophoretic deposition of MWCNT coating the MWCNT coating was subjected to a plasma treatment for 5 min. The plasma gas was nitrogen and the applied power was 30 W.

The electrophoretic solution for the second layer graphene based was devoid of binder and only included 80 mg/L graphene oxide (4-10% edge-oxidized) from Sigma-Aldrich in isopropanol. The graphene oxide was electrophoretically deposited using a pulse waveform with a peak voltage of 30 V, on-time of 0.8 msec, off-time of 0.2 msec for a duration of 15 min at room temperature of approximately 25° C. Subsequent to the electrophoretic deposition of MWCNT coating the MWCNT coating was subjected to a plasma treatment for 5 min. The plasma gas was nitrogen and the applied power was 30 W.

The electrophoretic solution for the third layer CNT coating was devoid of binder and only included 80 mg/L MWCNTs in ethanol. The MWCNTs were electrophoretically deposited using a pulse waveform with a peak voltage of 30 V, on-time of 0.8 msec, off-time of 0.2 msec for a duration of 15 min at room temperature of approximately 25° C. Subsequent to the electrophoretic deposition of MWCNT coating the MWCNT coating was subjected to a plasma treatment for 5 min. The plasma gas was nitrogen and the applied power was 30 W. The electrophoretic deposition followed by plasma treatment for the third layer CNT coating was repeated two more times under the same conditions with the exception that the final plasma treatment was conducted for 90 minutes.

The total electrophoretic deposition time was 75 minutes and the total plasma treatment time was 110 minutes for the three-layered low reflectance CNT based coatings.

The subject low reflectance coatings are applicable to orbiting platforms in Low Earth Orbit (LEO) defined as 200 to 1,000 km above Earth's surface. Orbiting platforms in LEO are exposed to atomic oxygen and susceptible erosion. Various embodiments of the coatings in the instant invention were evaluated in a ground-based facility to simulate exposure to atomic oxygen found in LEO applications. The samples were tested in a Fast Atom Sample Tester (FAST) and exposed to an oxygen atom beam flux at 8 km/second simulating approximately 41 days exposure in LEO. The samples were oriented with direct exposure to the oxygen atom source simulating the ram-facing (i.e. front surface of the orbiting platform) exposure at a distance of approximately 41 cm. These conditions simulated approximately 41 days in LEO.

The results for simulated LEO application in the FAST ground-based oxygen atom test facility for several embodiments of the low reflectance coatings as well as the PRIOR ART paint coatings are summarized in TABLE I.

TABLE I

SIMULATED LEO OXYGEN ATOM TEST RESULTS

| SAMPLE | MASS YIELD (g/O-atom) | CARBON YIELD C/O-atom) | MASS LOSS RELATIVE TO KAPTON |
|---|---|---|---|
| PRIOR ART Z-306 | $1.5 \times 10^{-24}$ | 7.7% | 0.351 |
| PRIOR ART Z-307 | $1.2 \times 10^{-24}$ | 6.3% | 0.278 |
| WORKING EXAMPLE III | Eroded | Eroded | Eroded |
| WORKING EXAMPLE IV | $9.6 \times 10^{-5}$ | 4.8% | 0.216 |
| WORKING EXAMPLE V | $9.1\text{-}10.0 \times 10^{-25}$ | 4.6 to 5.1% | 0.213 to 0.236 |

TABLE I-continued

SIMULATED LEO OXYGEN ATOM TEST RESULTS

| SAMPLE | MASS YIELD (g/O-atom) | CARBON YIELD C/O-atom) | MASS LOSS RELATIVE TO KAPTON |
|---|---|---|---|
| WORKING EXAMPLE VI | 7.3-9.0 × $10^{-25}$ | 3.7 to 4.5% | 0.171 to 0.210 |

The atomic oxygen exposure results in TABLE I include several measures of merit. The mass yield is the mass of sample eroded per incident oxygen atom in units of grams of sample removed per incident oxygen atom (g/O-atom). The carbon yield is the probability that a carbon atom will be eroded per incident oxygen atom in units of % of carbon atoms removed per incident oxygen atom (C/O-atom). The carbon yield analysis assumes the samples are pure carbon and provide a relative measure of merit for the nanocarbon low reflectance coatings of the instant inventions as the PRIOR ART paint coatings are not pure carbon. Kapton® is a registered trademark of E. I. du Pont de Nemours and Company and is a polyimide material used in various space and ground-based applications. Kapton® was included in the FAST atomic oxygen exposure tests to serve as a standard for comparison. The mass loss relative to Kapton® is the ratio of mass of sample removed to the mass of Kapton® removed. For all measures of merit the lower the number better the material performance during atomic oxygen exposure simulating LEO applications.

With the exception of WORKING EXAMPLE III, the PRIOR ART paint samples Z-306 and Z-307 exhibited the poorest performance. WORKING EXAMPLE III consisted of a single layer carbon nanotube coating with a binder dispersed throughout the coating. The presence of the binder was apparently responsible for the erosion of the coating as WORKING EXAMPLE IV did not contain a binder and performed better than the PRIOR ART paint coatings. The coating of WORKING EXAMPLE V consisted of a first carbon nanotube layer including a binder and a second carbon nanotube layer without a binder. The performance of WORKING EXAMPLE V was superior to WORKING EXAMPLE IV. The coating of WORKING EXAMPLE VI consisted of a first carbon nanotube layer including a binder; a second nanocarbon graphene layer without a binder; a third carbon nanotube layer without a binder. While not bound by theory, the nanocarbon graphene layer may act to block oxygen atom from passing through to the first carbon nanotube layer with binder and eroding the binder. The performance of WORKING EXAMPLE VI was superior to WORKING EXAMPLE V.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

What is claimed is:

1. A method of coating a substrate, the method comprising:
    adding carbon nanotubes and graphene to an electrophoretic solution including a binder in an electrophoretic deposition apparatus including the substrate and an electrode spaced from the substrate; and
    applying a pulsed current to the substrate and the electrode, the pulsed current configured to electrophoretically deposit alternating layers of carbon nanotubes and graphene onto the substrate.

2. The method of claim 1 further including subjecting the substrate coated with nanocarbon material to a plasma treatment.

3. The method of claim 1 in which the substrate is stainless steel, aluminum, tungsten, gold, titanium, beryllium, indium-doped tin oxide glass or fluorine-doped tin oxide glass.

4. The method of claim 1 in which one or more layers of graphene also include carbon nanotubes.

5. The method of claim 1 in which one or more layers of carbon nanotubes include graphene.

6. The method of claim 1 in which one or more alternating layers are plasma treated.

7. The method of claim 1 in which one or more layers of graphene include the binder.

8. The method of claim 1 in which one or more layers of carbon nanotubes include the binder.

9. A method of coating a substrate, the method comprising:
    adding a carbon nanotube material to an electrophoretic solution including a binder in an electrophoretic deposition apparatus including the substrate and an electrode spaced from the substrate;
    applying a pulsed current to the substrate and the electrode to electrophoretically deposit a first layer carbon nanotube material onto the substrate;
    adding a nanocarbon graphene material to another electrophoretic solution in said electrophoretic deposition apparatus including the substrate and an electrode spaced from the substrate; and
    applying a pulsed current to the substrate and electrode to electrophoretically deposit the nanocarbon graphene material onto the first layer carbon nanotube material.

10. The method of claim 9 further including subjecting one or more of the substrate coatings to a plasma treatment.

11. The method of claim 9 further including adding carbon nanotube material to another electrophoretic solution in said electrophoretic deposition apparatus including the substrate and an electrode spaced from the substrate; and
    applying a pulsed current to the substrate and electrode to electrophoretically deposit another carbon nanotube material layer onto the nanocarbon graphene material.

* * * * *